United States Patent
Lebel et al.

(10) Patent No.: US 10,819,824 B2
(45) Date of Patent: Oct. 27, 2020

(54) SECURE MOBILE LIGHTING CONTROL SYSTEM

(71) Applicant: Lumenetix, Inc., Scotts Valley, CA (US)

(72) Inventors: Eric Lebel, Tiburon, CA (US); Daniel Gochnauer, Saratoga, CA (US); David Bowers, San Jose, CA (US); Thomas Poliquin, Aptos, CA (US)

(73) Assignee: Lumenetix, LLC, Scotts Valley, CA (US)

( * ) Notice: Subject to any disclaimer, the term of this patent is extended or adjusted under 35 U.S.C. 154(b) by 87 days.

(21) Appl. No.: 15/151,815

(22) Filed: May 11, 2016

(65) Prior Publication Data

US 2016/0338170 A1    Nov. 17, 2016

Related U.S. Application Data

(60) Provisional application No. 62/159,880, filed on May 11, 2015.

(51) Int. Cl.
*H04L 29/08* (2006.01)
*H04W 4/80* (2018.01)
(Continued)

(52) U.S. Cl.
CPC ............. *H04L 67/303* (2013.01); *H04W 4/80* (2018.02); *H05B 45/20* (2020.01); *H05B 47/19* (2020.01)

(58) Field of Classification Search
CPC ..... H04L 9/0861; H04L 9/088; H04L 9/3228; H04L 9/3226; H04L 12/417;
(Continued)

(56) References Cited

U.S. PATENT DOCUMENTS

| | | | |
|---|---|---|---|
| 5,099,348 A | 3/1992 | Huddleston et al. | |
| 5,109,222 A | 4/1992 | Welty | |

(Continued)

FOREIGN PATENT DOCUMENTS

| | | | |
|---|---|---|---|
| JP | 2005011628 A | 1/2005 | |
| JP | 2006059605 A | 3/2006 | |
| WO | 2003055273 A2 | 7/2003 | |

OTHER PUBLICATIONS

Final Office Action dated Apr. 4, 2018 for U.S. Appl. No. 14/705,850 by Bowers, D. et al., filed May 6, 2015.
(Continued)

*Primary Examiner* — Wei (Victor) Y Chan
(74) *Attorney, Agent, or Firm* — Lewis Roca Rothgerber Christie LLP

(57) ABSTRACT

Various embodiments include a lamp control unit coupled to or part of one or more light emitting diode (LED) based lamps. The lamp control unit can receive, from a lamp commissioning application of a mobile device via a wireless protocol, one or more commissionable lighting parameters to configure light output of the LED based lamps. The lamp control unit can lock access to change the commissionable lighting parameters with a password. One or more operational lighting parameters of the lamp control unit can be adjusted via a control interface (e.g., an adjustable voltage dimmer) other than the wireless protocol. The lamp control unit can drive the LED-based lamps based on the operational lighting parameters and the commissionable lighting parameters.

24 Claims, 22 Drawing Sheets

(51) Int. Cl.
    *H05B 45/20*     (2020.01)
    *H05B 47/19*     (2020.01)
    *H05B 47/105*     (2020.01)
    *H05B 45/10*     (2020.01)

(58) Field of Classification Search
    CPC ......... H04L 29/06789; H04L 29/06795; H04L 63/067; H04L 63/083; H04L 63/0838; H04L 63/0846; H04L 2463/061; H04L 2463/08
    USPC .......... 315/292, 362, 294, 297, 304
    See application file for complete search history.

(56) References Cited

U.S. PATENT DOCUMENTS

| | | | |
|---|---|---|---|
| 5,457,478 | A | 10/1995 | Frank |
| 6,118,230 | A | 9/2000 | Fleischmann |
| 6,411,046 | B1 | 6/2002 | Muthu et al. |
| 7,423,387 | B2 | 9/2008 | Robinson et al. |
| 8,796,948 | B2 | 8/2014 | Weaver et al. |
| 8,973,113 | B1* | 3/2015 | Eatough .................. G06F 21/31 726/6 |
| 9,060,409 | B2 | 6/2015 | Bowers et al. |
| 2002/0097000 | A1 | 7/2002 | Muthu et al. |
| 2002/0101197 | A1 | 8/2002 | Lys et al. |
| 2005/0248299 | A1 | 11/2005 | Chemel et al. |
| 2006/0002110 | A1* | 1/2006 | Dowling ............... F21V 23/006 362/249.05 |
| 2008/0191631 | A1 | 8/2008 | Archenhold et al. |
| 2010/0110672 | A1 | 5/2010 | Durand et al. |
| 2013/0043797 | A1 | 2/2013 | Huang et al. |
| 2013/0063042 | A1* | 3/2013 | Bora ..................... H05B 47/19 315/292 |
| 2013/0221852 | A1 | 8/2013 | Bowers et al. |
| 2014/0152188 | A1* | 6/2014 | Bora ..................... H05B 45/00 315/210 |
| 2014/0333208 | A1 | 11/2014 | Weaver et al. |
| 2015/0022091 | A1* | 1/2015 | Deixler ............. H05B 37/0218 315/149 |
| 2015/0067760 | A1* | 3/2015 | Waltermann ........ G06F 21/6218 726/1 |
| 2015/0278137 | A1* | 10/2015 | Gan ..................... H04L 69/323 710/11 |
| 2016/0055469 | A1* | 2/2016 | Kim ..................... H04L 41/12 705/21 |
| 2016/0205748 | A1* | 7/2016 | Lashina ................ G06F 1/1643 315/130 |
| 2017/0006694 | A1* | 1/2017 | Davis ................. H05B 37/0263 |

OTHER PUBLICATIONS

International Search Report and Written Opinion dated Dec. 28, 2010, for International Patent Application No. PCT/2010/035295 filed May 18, 2010, 13 pages.
Non-Final Office Action dated Dec. 5, 2013, for Co-Pending U.S. Appl. No. 12/782,038 by Weaver, M., filed May 18, 2010.
Non-Final Office Action dated May 12, 2015, for U.S. Appl. No. 14/447,448 by Weaver, M. et al., filed Jul. 30, 2014.
Non-Final Office Action dated May 18, 2017 for U.S. Appl. No. 14/105,850 by Bowers, D. et al., filed May 6, 2015.
Notice of Allowance dated Feb. 9, 2015, for U.S. Appl. No. 13/766,745 by Bowers, D. et al., filed Feb. 13, 2013.
Notice of Allowance dated Jun. 23, 2014, for U.S. Appl. No. 12/782,038 of Weaver, M., filed May 18, 2010.
Notice of Allowance dated May 13, 2014, for Co-Pending U.S. Appl. No. 12/782,038 by Weaver, M., filed May 18, 2010.
Restriction Requirement dated Sep. 22, 2016 for U.S. Appl. No. 14/705,850 of Bowers, D. et al., filed May 6, 2015.
Restriction Requirement dated Mar. 25, 2013 in Co-Pending U.S. Appl. No. 12/782,038 of Weaver. M., et al., filed May 18, 2010.

\* cited by examiner

SECURE MOBILE LIGHTING CONTROL SYSTEM

CROSS-REFERENCE TO RELATED APPLICATION(S)

This application claims the benefit of U.S. Provisional Patent Application No. 62/159,180 entitled "SECURE MOBILE LIGHTING CONTROL SYSTEM," filed on May 11, 2015, which is incorporated by reference herein in its entirety.

This application relates to the U.S. Non-Provisional patent application Ser. No. 13/766,745, entitled "MOBILE DEVICE APPLICATION FOR REMOTELY CONTROLLING AN LED-BASED LAMP," filed on Feb. 13, 2013, which is incorporated by reference herein in its entirety.

BACKGROUND

Conventional systems for controlling lighting in homes and other buildings suffer from many drawbacks. One such drawback is that these systems rely on conventional lighting technologies, such as incandescent bulbs and fluorescent bulbs. Such light sources are limited in many respects. For example, such light sources typically do not offer long life or high energy efficiency. Further, such light sources offer only a limited selection of lighting characteristics (e.g., hue, color temperature, intensity/brightness, etc.). These light sources also tend to have non-adjustable lighting performance measures (e.g., power efficacy, transmissive color quality, reflective color quality, etc.). The light output of such light sources typically changes or degrades over time as the bulb ages. In systems that do not rely on conventional lighting technologies, such as systems that rely on light emitting diodes ("LEDs"), longer system lives are possible and high energy efficiency can be achieved. However, in such systems issues with color quality can still exist.

A light source can be characterized by various light characterization measures, such as color temperature, hue, and brightness. Performance of the light source can also be measured against a color quality measure, such as the color rendering index ("CRI"). The color temperature of a light source is the temperature at which the color of light emitted from a heated black-body radiator is matched by the color of the light source. For a light source which does not substantially emulate a black body radiator, such as a fluorescent bulb or an LED, the correlated color temperature ("CCT") of the light source is the temperature at which the color of light emitted from a heated black-body radiator is approximated by the color of the light source. The CRI of a light source is a measure of the ability of a light source to reproduce the colors of various objects faithfully in comparison with an ideal or natural light source. The CCT and CRI of LED light sources is typically difficult to tune and adjust. Further difficulty arises when trying to maintain an acceptable CRI while varying the CCT of an LED light source.

DISCLOSURE OVERVIEW

Several embodiments include a lamp commissioning application to commission lamp control units. Each lamp control unit can drive at least one LED-based lamp. The lamp commissioning application can connect to the lamp control unit via a wireless protocol, such as Bluetooth. Access to commission the lamp control unit and to extract data from the lamp control unit (e.g., and thereby the at least one LED based lamp) can be protected by one or more passwords to be authenticated in the lamp and/or at a remote server. For example, the lamp commissioning application can be used by a light installer. The light installer can enter a password on the lamp commissioning application, and lock the lamp control unit that the lamp commissioning application is connected to. In some embodiments, a backend server system can maintain a master password. The installer user can obtain the master password from a manufacturer operating the backend server system. The installer user can produce the master password on the lamp commissioning application to be verified on the backend server system. The backend server system can change the master password at any time. In response to verifying the master password at the lamp commissioning application, the backend service server can authorize the lamp commissioning application (e.g., programmed by the manufacturer) to transmit a secret string to one or more lamp control units for a complete reset (e.g., delete any password previously stored in the lamp control units). The manufacturer can pre-configure the lamp control units in the manufacturing stage to recognize the secret string.

In some embodiments, the lamp commissioning application can be coupled to multiple lamp control units and be able to commission the lamp control units simultaneously. In some embodiments, the lamp commissioning application can sequentially "copy and paste" commissionable lighting parameters from one lamp control unit to another. In some embodiments, when simultaneously commissioning multiple lamp control units or when copying-and-pasting to multiple lamp control units, the lamp commissioning application and/or the lamp control units can transform the commissionable lighting parameters to tailor to ambient lighting environment and/or light source characteristics particular to one or more lamps driven by each of the lamp control units.

The lamp commissioning application can collect feedback information from the lamp control units coupled to the mobile device. For example, the lamp control units can provide operating health statuses, color calibration parameters, ownership information, and grouping information (e.g., if two or more lamps are grouped together) to the lamp commissioning application. In some embodiments, a lamp control unit can receive information from one or more lamps connected thereto, and provide the received information to the lamp commissioning application.

Some embodiments of this disclosure have other aspects, elements, features, and steps in addition to or in place of what is described above. These potential additions and replacements are described throughout the rest of the specification

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Figure 1A:
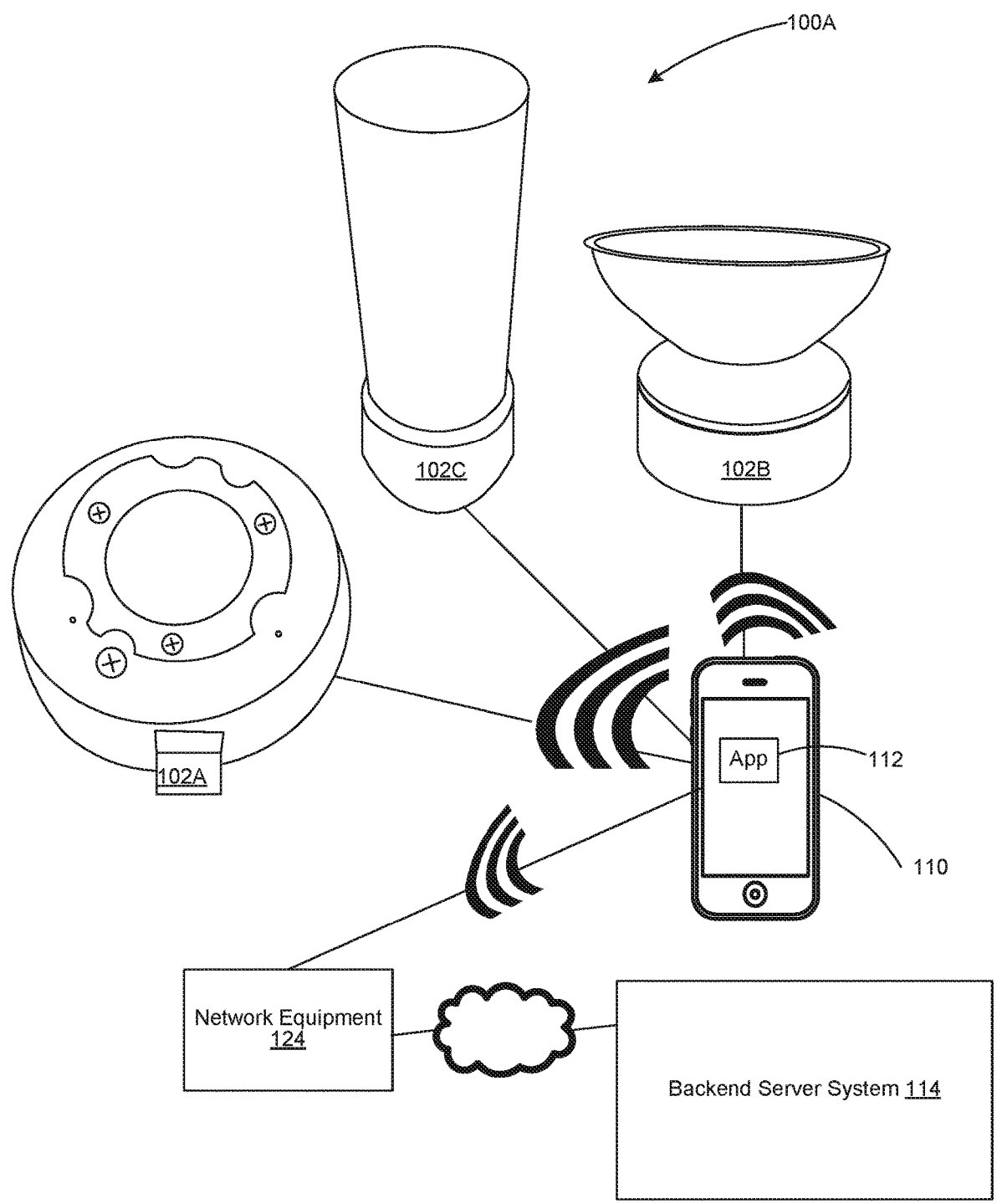
FIG. 1A is a block diagram illustrating a lighting system capable of being commissioned by a lamp commissioning application, in accordance with some embodiments.

FIG. 1A is a block diagram illustrating a lighting system 100A capable of being commissioned by a lamp commissioning application, in accordance with some embodiments. The lighting system 100A includes one or more lamp units (e.g., a lamp unit 102A, a lamp unit 102B, and a lamp unit 102C, collectively as the "lamp units 102"). The lamp units 102 can be identical or different lamp modules. At least some of the lamp units 102 may be LED-based and/or require light mixing control in order to produce accurate, consistent, and/or natural (e.g., mimicking natural light sources) illumination.

The lighting system 100A can include a mobile device 110. The mobile device 110 can include a lamp commissioning application 112. The lamp commissioning application 112 can configure the mobile device 110 to commission the lamp units 102. The lighting system 100A can include a backend server system 114. The backend server system 114 can be configured to communicate with the lamp commissioning application 112 to authorize the lamp commissioning application 112 to configure or service at least one of the lamp units 102. The backend server system 114 can also communicate with the lamp commissioning application 112 to collect data from at least one of the lamp units 102. The backend server system 114 can also communicate with the lamp commissioning application 112 to push maintenance updates to the lamp commissioning application 112 and/or at least one of the lamp units 102. The maintenance update can include logics of a control engine, a light mixing model, one or more parameters (e.g., calibration, preference, preset, and/or security parameters) for at least one of the lamp units 102, or any combination thereof.

In one example, the lamp units 102 can be within a same physical space. There may be a network equipment 126 (e.g., a router, a switch, an access point, etc.) within the physical space. In some embodiments, the network equipment 126 can facilitate the communication between the lamp units 102 and the mobile device 110. In some embodiments, the mobile device 110 can communicate with at least one of the lamp units 102 directly via a wireless protocol, such as Bluetooth LTE, Bluetooth, Wi-Fi Direct, etc. without the network equipment 126. In some embodiments, the network equipment 126 can facilitate the communication between the mobile device 110 and the backend server system 114.

Figure 1B:
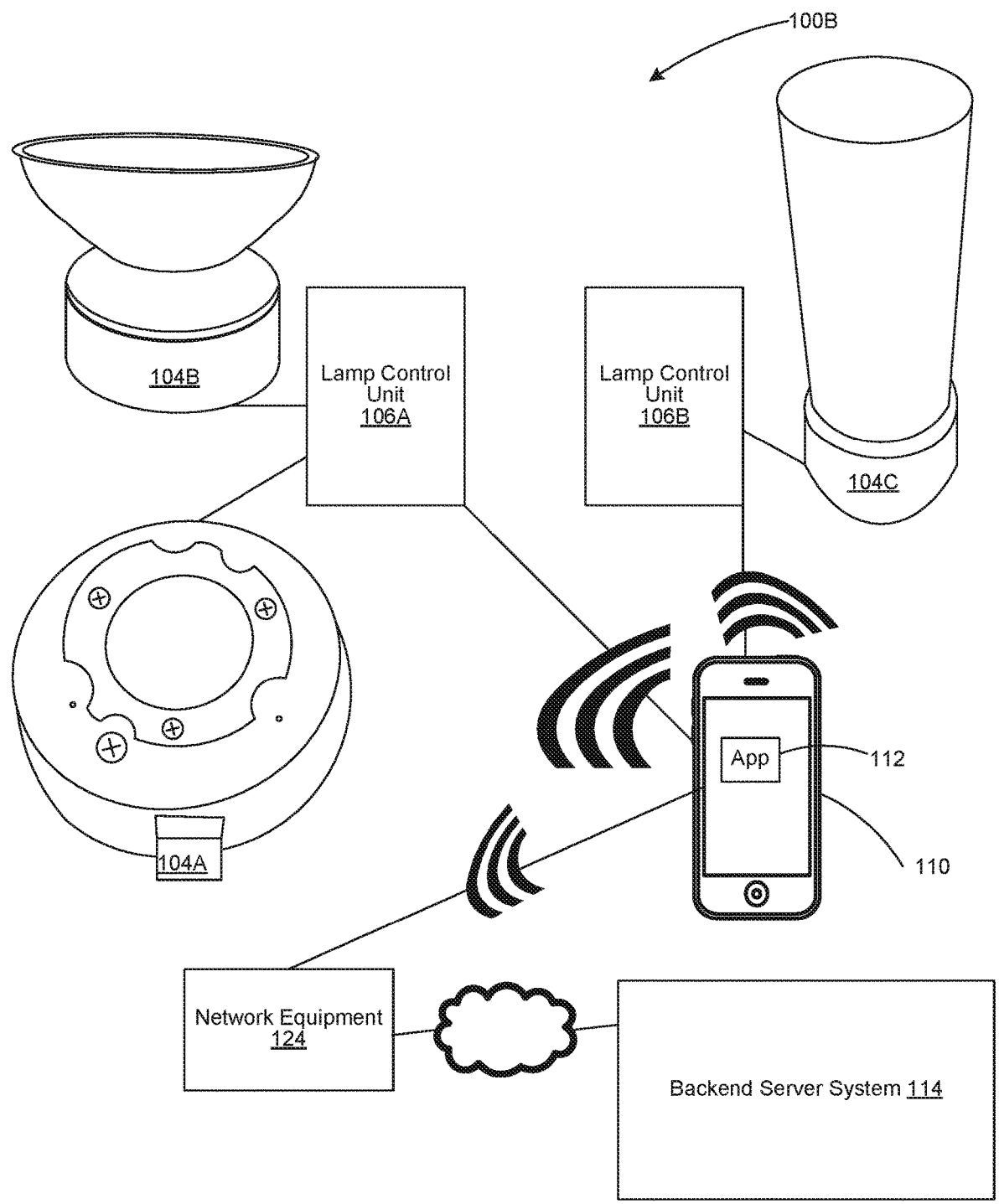
FIG. 1B is a block diagram illustrating a lighting system capable of being commissioned by a lamp commissioning application, in accordance with some embodiments.

In some embodiments, components of one of the lamp units 102 can be separated into multiple devices, such as the embodiments illustrated in FIG. 1B. In this disclosure, some components of a lamp unit can be considered a "lamp control unit" within the lamp unit.

FIG. 1B is a block diagram illustrating a lighting system 100B capable of being commissioned by a lamp commissioning application, in accordance with some embodiments. Similar to the lighting system 100A, the lighting system 100B includes one or more lamp units (e.g., the lamp unit 104A, the lamp unit 104B, and the lamp unit 104C, collectively as the "lamp units 104"). The lamp units 104 can be identical or different lamp modules. At least one of the lamp units 104 may be LED-based and/or require light mixing control in order to produce accurate, consistent, and/or natural (e.g., mimicking natural light sources) illumination. The lamp units 104 are coupled to one or more lamp control units (e.g., a lamp control unit 106A and a lamp control unit 106B, collectively as the "lamp control units 106"). A lamp control unit can drive one or more lamp units. For example, the lamp control unit 106A can be coupled to the lamp unit 104A and the lamp unit 104B; and the lamp control unit 106B can be coupled to the lamp unit 104C.

Similar to the lighting system 100A, the lighting system 100B can include the mobile device 110. The mobile device 110 can implement the lamp commissioning application 112. The lamp commissioning application 112 can configure the mobile device 110 to communicate and/or commission with at least one of the lamp control units 106. The lighting system 100B can include the backend server system 114. The backend server system 114 can be configured to send a message to the lamp commissioning application 112 to authorize the lamp commissioning application 112 to configure or service at least one of the lamp control units 106. The backend server system 114 can also communicate with the lamp commissioning application 112 to collect data from at least one of the lamp control units 106. The backend server system 114 can also communicate with the lamp commissioning application 112 to push maintenance updates to the lamp commissioning application 112, at least one of the lamp control units 106, at least one of the lamp units 104, or any combination thereof. The maintenance update can include logics of a control engine, a light mixing model, one or more parameters (e.g., calibration, preference, preset, and/or security parameters) for at least one of the lamp control units 106 and/or at least one of the lamp units 104, or any combination thereof.

In one example, the lamp units 104 and the lamp control units 106 can be within a same physical space. There may be the network equipment 126 (e.g., a router, a switch, an access point, etc.) within the physical space. In some embodiments, the network equipment 126 can facilitate the communication between the lamp control units 106 and the mobile device 110. In some embodiments, the mobile device 110 can communicate with at least one of the lamp units 104 and/or the lamp control units 106 directly via a wireless protocol, such as Bluetooth LTE, Bluetooth, Wi-Fi Direct, etc. without the network equipment 126. In some embodiments, the network equipment 126 can facilitate the communication between the mobile device 110 and the backend server system 114.

Figure 2A:
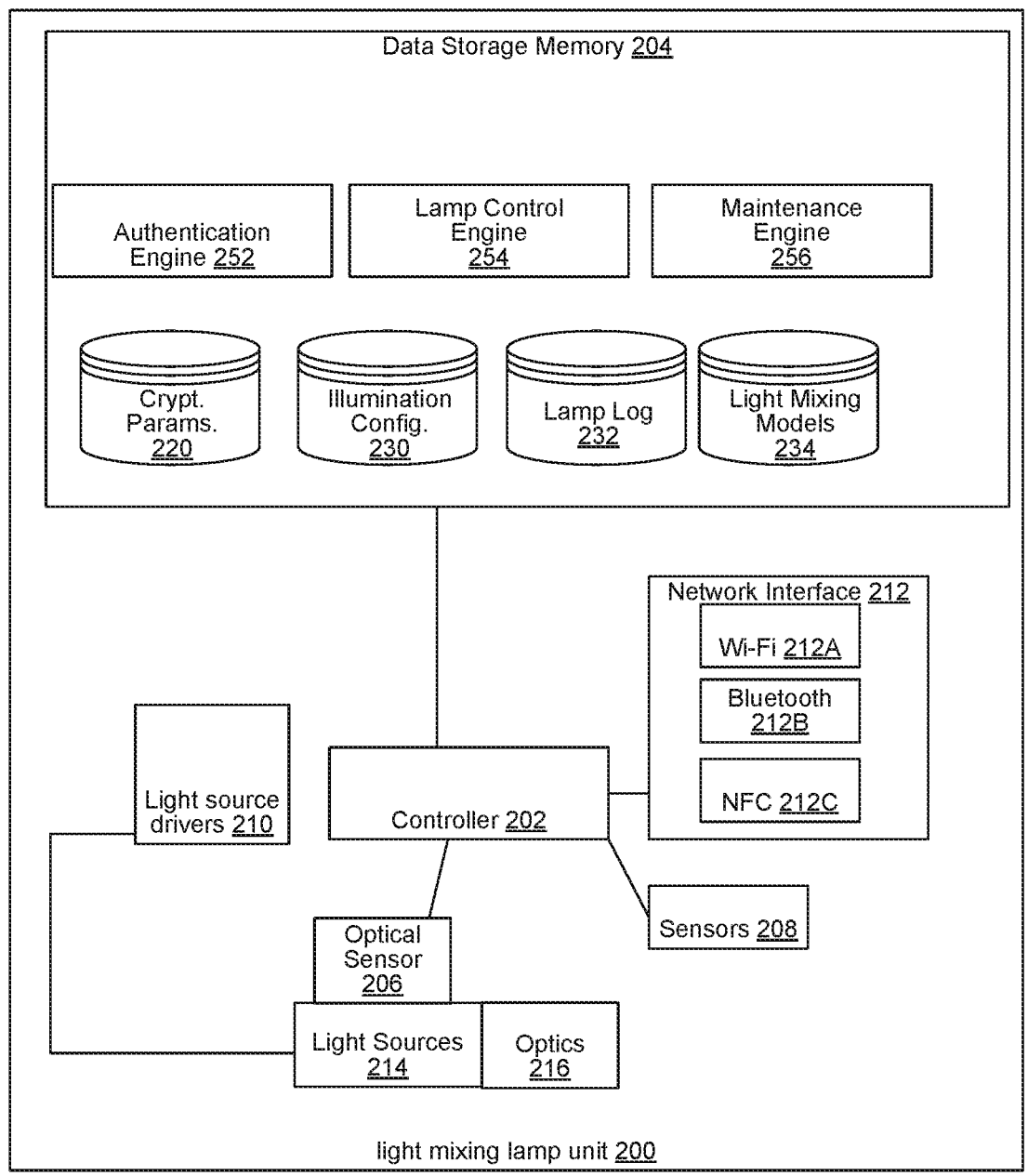
FIG. 2A is a block diagram of a light mixing lamp unit, in accordance with various embodiments.

FIG. 2A is a block diagram of a light mixing lamp unit 200, in accordance with various embodiments. The light mixing lamp unit 200 (e.g., one of the lamp units 102 of FIG. 1A). The light mixing lamp unit 200 can include a controller 202, a data storage memory 204, an optical sensor system 206 (e.g., a camera, a light sensor, a light filter, a tristimulus sensor, a spectral analyzer, or any combination thereof), one or more sensors 208 (e.g., temperature sensors, electric voltage sensors, electric current sensors, ambient light sensors, or any combination thereof), one or more light source drivers 210, one or more network interface components (e.g., a Wi-Fi component 212A, a Bluetooth component 212B, a near field communication component 212C, or any combination thereof, collectively as the "network interface components 212"), one or more light sources 214, one or more optics components 216, or any combination thereof. Some of these components can be considered an internal "lamp control unit" of the light mixing lamp unit 200. That is, the lamp control unit can be part of the light mixing lamp unit 200.

The light sources 214 can be light emitting diodes (LEDs), such as solid state LEDs or organic LEDs. In some embodiments, the light sources 214 can include different color channels. The optics components 216 can mix, direct, filter, alter, or any combination thereof, individual light outputs produced respectively from the light sources 214. In some embodiments, the optics components 216 include an adjustable optical component, whose effects on its inputting light configurable by the controller 202 or by an external force. In some embodiments, the optics components 216 include only passive optics and/or static optics.

The data storage memory 204 can protected via one or more hardware or software cryptographic mechanisms. For example, the data storage memory 204 can have a secure store storing the cryptographic parameters 220 associated with the light mixing lamp unit 200 for preventing unauthorized modification or replacement of functional components of the light mixing lamp unit 200 and for preventing unauthorized modification or replacement of parameters of the functional components. The data storage memory 204 can also store an illumination configuration profile 230 for the light mixing lamp unit 200. The data storage memory 204 can store a lamp log 232 for the light mixing lamp unit 200.

In one example, the illumination configuration profile 230 can include a spectral representation of an expected illumination produced from the light mixing lamp unit 200 (e.g., produced from the light sources 214 or from the optics components 216). In one example, the illumination configuration profile 230 can include one or more color attributes and/or color metrics used to characterize visual illumination (e.g., correlated color temperature, hue, brightness/intensity, saturation, or any combination thereof). In one example, the illumination configuration profile 230 can include one or more performance criteria (e.g. driving attribute limitations) when producing visual illumination, such as power consumption, thermal profile, efficiency, efficacy, or any combination thereof. In one example, the illumination configuration profile 230 can include driving parameters when producing visual illumination, such as driving current, driving signal pattern, driving voltage, operational temperature (e.g., if controllable), or any combination thereof, of the light sources 214. In some embodiments, the data storage memory 204 stores multiple instances of the illumination configuration profile 230, while only a subset of the instances is actively used to configure the light mixing lamp unit 200. In some embodiments, the illumination configuration profile 230 is not indicated as the driving parameters because the light sources 214 and the optics components 216 may degrade and/or because depending on ambient temperature or operating temperature, the same driving parameters may not produce the same expected illumination.

In one example, the lamp log 232 includes communication activities occurring through the network interface components 212. In one example, the lamp log 232 includes a historic log of configuration changes to the illumination configuration profile 230. In one example, the lamp log 232 includes sensor data collected from the sensors 208. In one example, the lamp log 232 includes health data (e.g., optical changes in the light sources 214 or the optics components 216). In some embodiments, some portions of the lamp log 232 are only accessible to an authenticated agent of a backend server. In some embodiments, some portions of the lamp log 232 can be associated with an owner/user. That association can be stored in the backend server, a lamp commissioning application, and/or the data storage memory 204. The controller 202 can implement an authentication engine 242 to authenticate the owner/user. In those embodiments, those portions of the lamp log 232 may be accessible only to the authenticated owner/user associated with the secured portions.

In several embodiments, the data storage memory 204 includes one or more light mixing models 234. In the examples that the illumination configuration profile 230 is not indicated as the driving parameters, then the controller 202 has to determine how to drive the light sources 214 to produce the intended illumination profile according to the illumination configuration profile 230. In these examples, the light mixing models 234 can provide a way for the controller 202 to determine how to drive the light sources 214.

In several embodiments, the data storage memory 204 stores executable instructions. The executable instructions can configure the controller 202 to implement one or more engines or modules, including, for example, the authentication engine 242, a lamp control engine 244, and/or a maintenance engine 246. The authentication engine 242 restricts access to change executable instructions, data, or parameters of the light mixing lamp unit 200 and/or access to extract data from the light mixing lamp unit 200. The lamp control engine 244 can communicate with outside sources (e.g., a mobile device) via one of the network interface components 212 to accept commands therefrom. Based on a command, the lamp control engine 244 can change an operating state of the light mixing lamp unit 200, for example, to produce a different illumination. The lamp control engine 244 can determine how to drive the light sources 214 based on at least one of the light mixing models 234, one or more sensor feeds from at least a subset of the optical sensor system 206 and/or the sensors 208, the illumination configuration profile 230, one or more commissionable lighting parameters, one or more operational lighting parameters, or any combination thereof. The maintenance engine 246 can monitor sensor feeds from the optical sensor system 206 and/or the sensors 208 to determine whether or not a recalculation of at least one of the driving parameters and/or the light mixing models may be necessary. The maintenance engine 246 can be executed periodically according to a schedule. The maintenance engine 246 can be triggered by an external command or by the light mixing lamp unit 200 being turned on. The maintenance engine 246 can also monitor the sensor feeds to update the lamp log 232.

In some embodiments, the optical sensor system 206 can be utilized to provide feedback when adjusting the illumination according to the illumination configuration profile 230. In some embodiments the optical sensor system 206 can be utilized to generate health data, for example, to determine whether or not there is decalibration.

In some embodiments, the light mixing lamp unit 200 may be hardcoded with an identifier and/or a cryptographic parameter from the manufacturer. The identifier and/or the cryptographic parameter enables agents of the manufacturer (e.g., a backend server or a lamp commissioning application) to uniquely identify the lamp unit and extract data associated with the lamp unit only available to the manufacturer. The identifier and/or the cryptographic parameter can also enable agents of the manufacturer to verify that the lamp unit is authentic and complies with known to security protocols and/or policies.

Figure 2B:
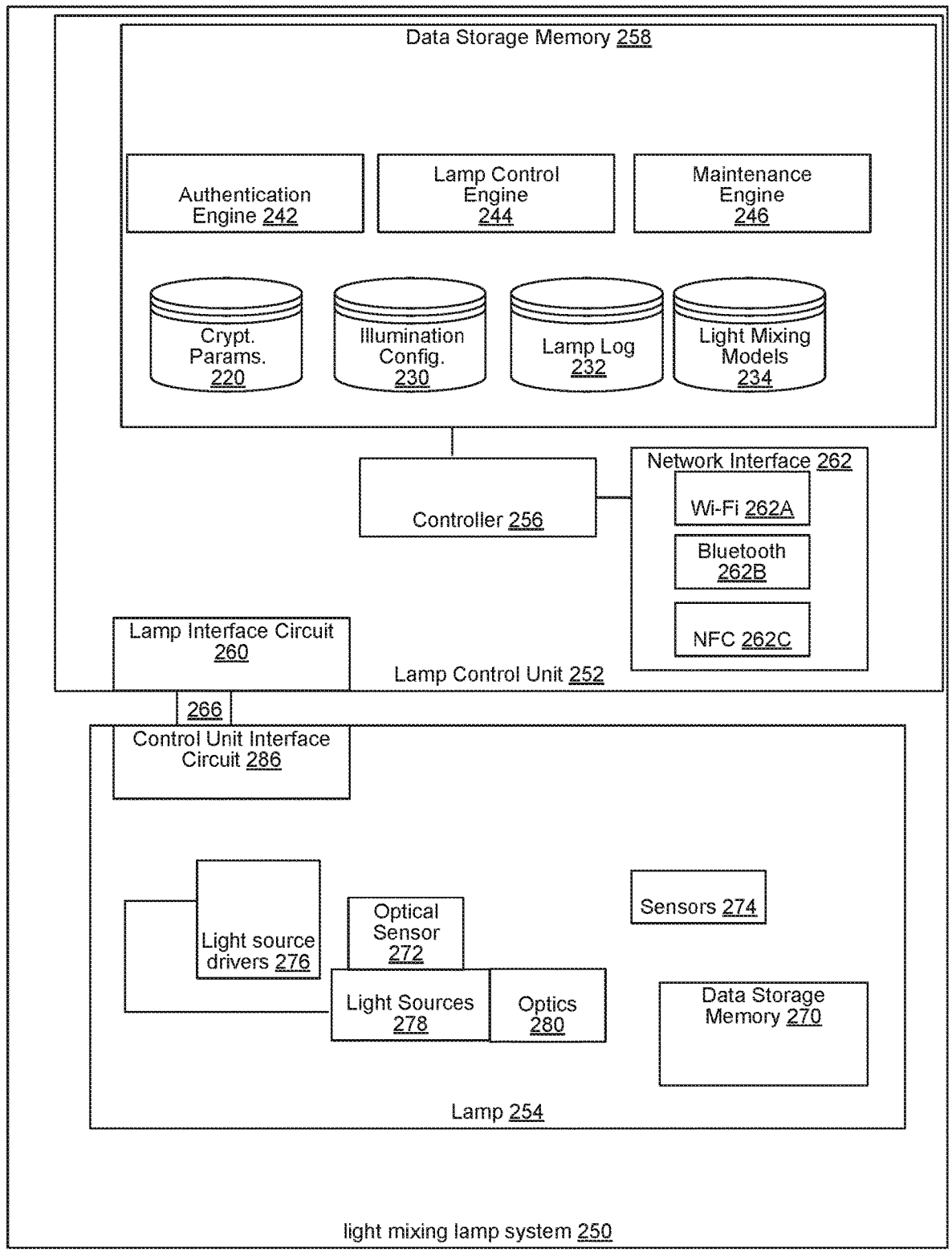
FIG. 2B is a block diagram of a light mixing lamp system, in accordance with various embodiments.

FIG. 2B is a block diagram of a light mixing lamp system 250, in accordance with various embodiments. The light mixing lamp system 250 can include a lamp control unit 252 coupled to at least a lamp 254. The lamp control unit 252 can include a controller 256, a data storage memory 258, a lamp interface circuit 260, one or more network interface components 262, or any combination thereof. The lamp control unit 252 can be coupled to the lamp 254 via a cable 266. The lamp 254 can include a data storage memory 270, an optical sensor system 272, one or more sensors 274, one or more light source drivers 276 coupled to the lamp interface circuit 260 (e.g., via the cable 266), one or more light sources 278, one or more optics components 280, or any combination thereof. In these embodiments, the controller 256 can serve the functionalities of the controller 202; the data storage memory 258 and/or the data storage memory 270 can serve the functionalities of the data storage memory 204; and the network interface components 262 can serve the functionalities of the network interface components 212. In these embodiments, the optical sensor system 272, the sensors 274, the light sources 278, and the optics components 280 can respectively serve functionalities of the optical sensor system 206, the sensors 208, the light sources 214, and the optics components 216. The lamp control unit 252 can communicate with the lamp 254 via the lamp interface circuit 260. The lamp 254 can communicate with the lamp control unit 252 via a control unit interface circuit 286.

The controller 256 can access one or more commissioned parameters and a color mixing model stored in the data storage memory 270. Based on the color mixing model and the commissioned parameters, the controller 256 can determine the driving signals to send via the lamp interface circuit 260. In some embodiments, the driving signals include digital or analog indications of the flux ratios of the color channels of the light sources 278. In these embodiments, the light source drivers 276 can interpret the driving signals and provide (e.g., by drawing power from a power source coupled to the lamp 254) electrical currents to the color channels of the light sources 278 according to the indicated flux ratios. In some embodiments, the driving signals are power signals configured with the correct flux ratios according to the controller 256.

Figure 3:
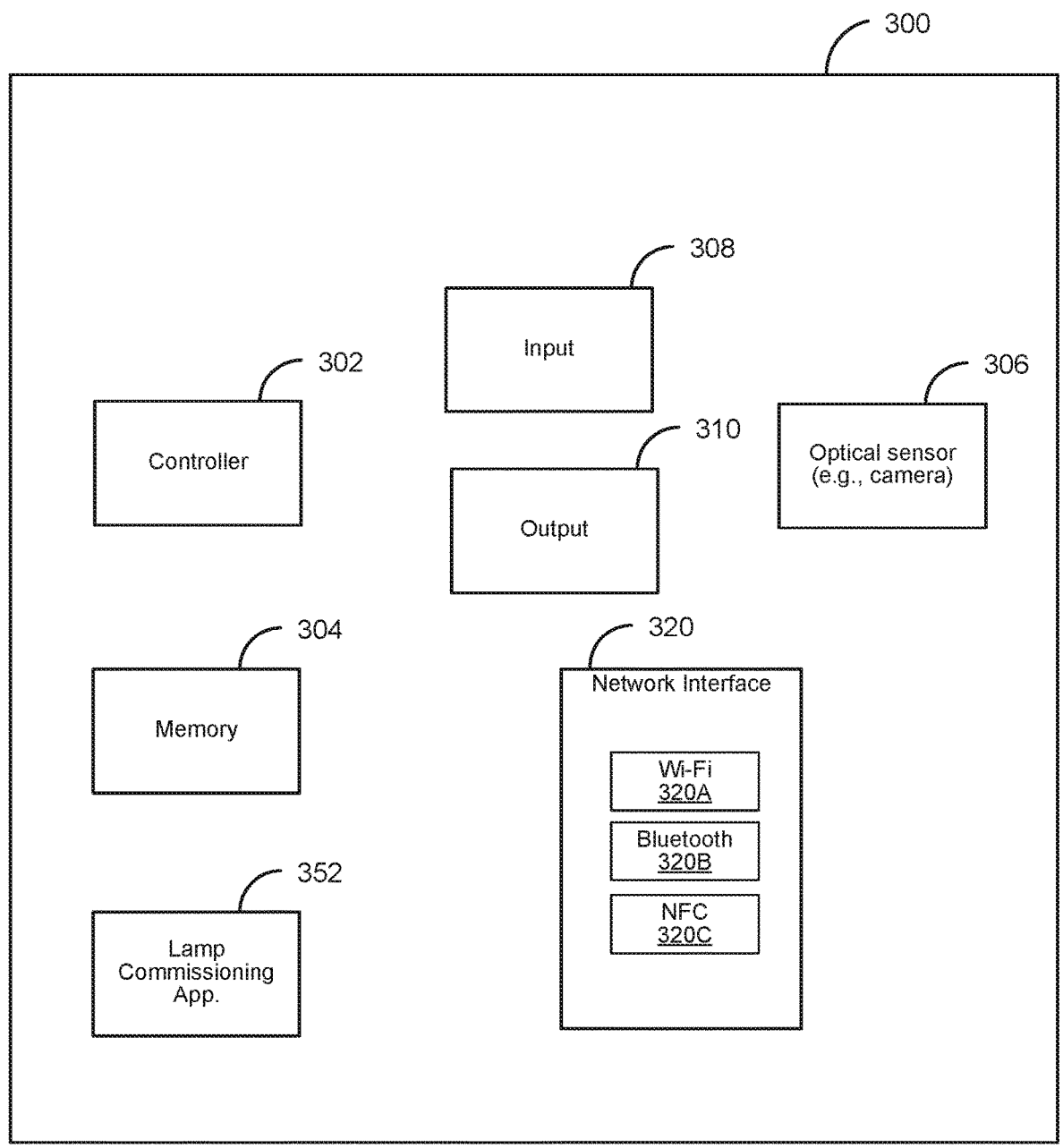
FIG. 3 is a block diagram of a lamp commissioning application running on a mobile device for controlling a lamp unit, in accordance with various embodiments.

FIG. 3 is a block diagram of a lamp commissioning application 352 running on a mobile device 300 for controlling a lamp control unit (e.g., part of the light mixing lamp unit 200 of FIG. 2A or the lamp control unit 252 of FIG. 2B), in accordance with various embodiments. The mobile device 300 can be a smart phone, a tablet, a wearable device, Internet of things device, a laptop, or any other type of mobile computing apparatus. The mobile device 300 can include a controller 302, a data storage memory 304, an optical sensor system 306 (e.g., a camera, a light sensor, a light filter, a tristimulus sensor, a spectral analyzer, or any combination thereof), one or more input devices 308, one or more output devices 310, one or more network interface components (e.g., a Wi-Fi component 312A, a Bluetooth component 312B, a near field communication component 312C, or any combination thereof, collectively as the "network interface components 312"), or any combination thereof. In some embodiments, an input device and an output device can be integrated, such as a touchscreen.

In several embodiments, the data storage memory 304 stores executable instructions. The executable instructions can configure the controller 302 to implement one or more engines or modules, including, for example, the lamp commissioning application 352 (e.g., the lamp commissioning application 112). The lamp commissioning application 352 can generate a user interface via one or more of the input devices 308 and output devices 310. The user interface, for example, may be illustrated as the screenshots in FIGS. 8-20.

Figure 8:
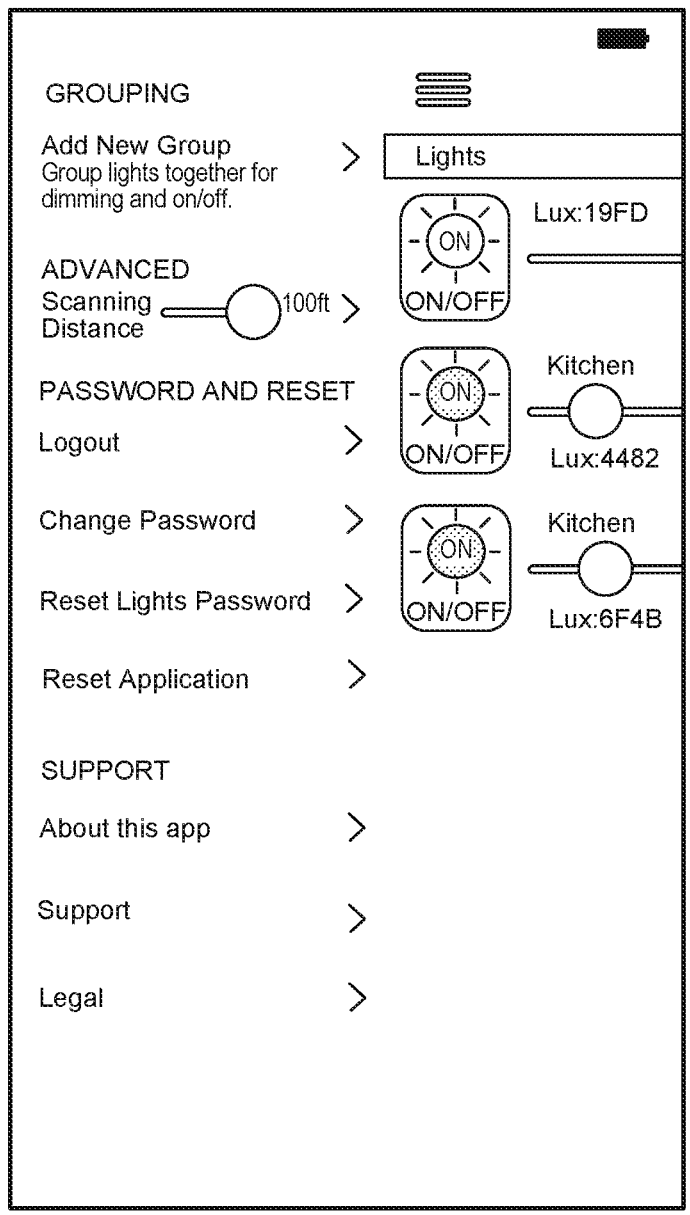
FIG. 8 is a screenshot of a user interface implemented by a lamp commissioning application running on a mobile device for managing a commissioning control group of lamp control units, in accordance with various embodiments.

FIG. 8 is a screenshot of a user interface implemented by a lamp commissioning application running on a mobile device for managing a commissioning control group of lamp control units, in accordance with various embodiments.

Figure 9:
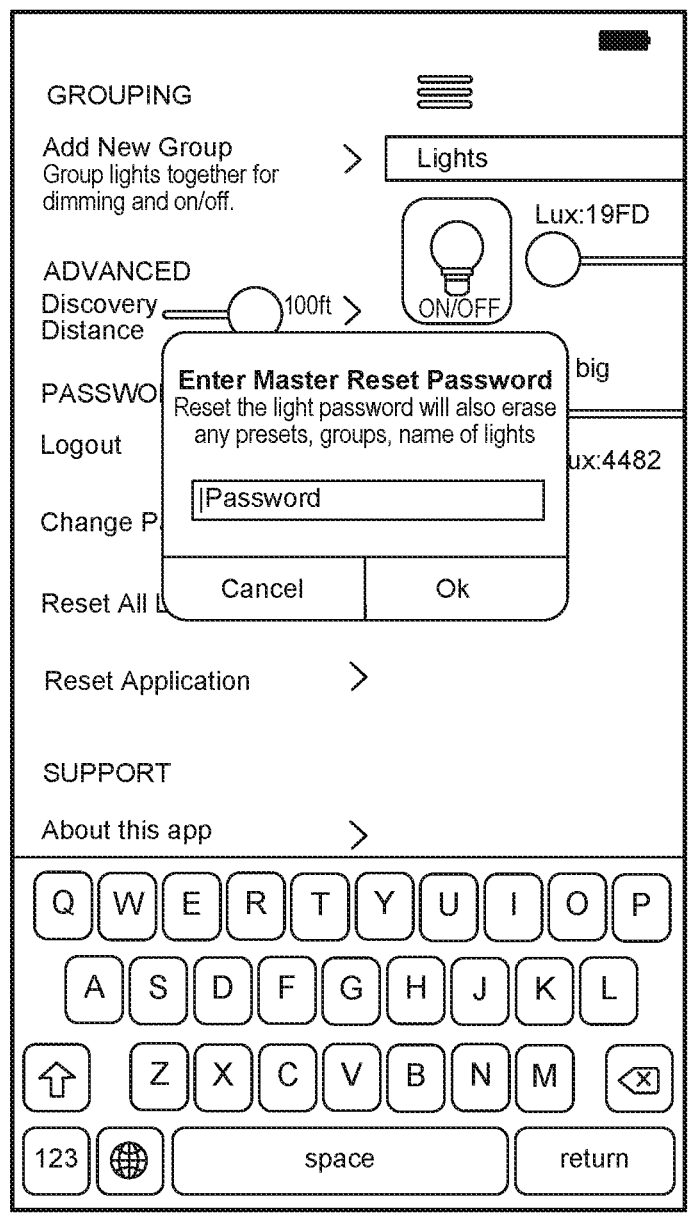
FIG. 9 is a first screenshot of a user interface implemented by a lamp commissioning application running on a mobile device for resetting lamp control units by authenticating with a backend server system, in accordance with various embodiments.

FIG. 9 is a first screenshot of a user interface implemented by a lamp commissioning application running on a mobile device for resetting lamp control units by authenticating with a backend server system, in accordance with various embodiments.

Figure 10:
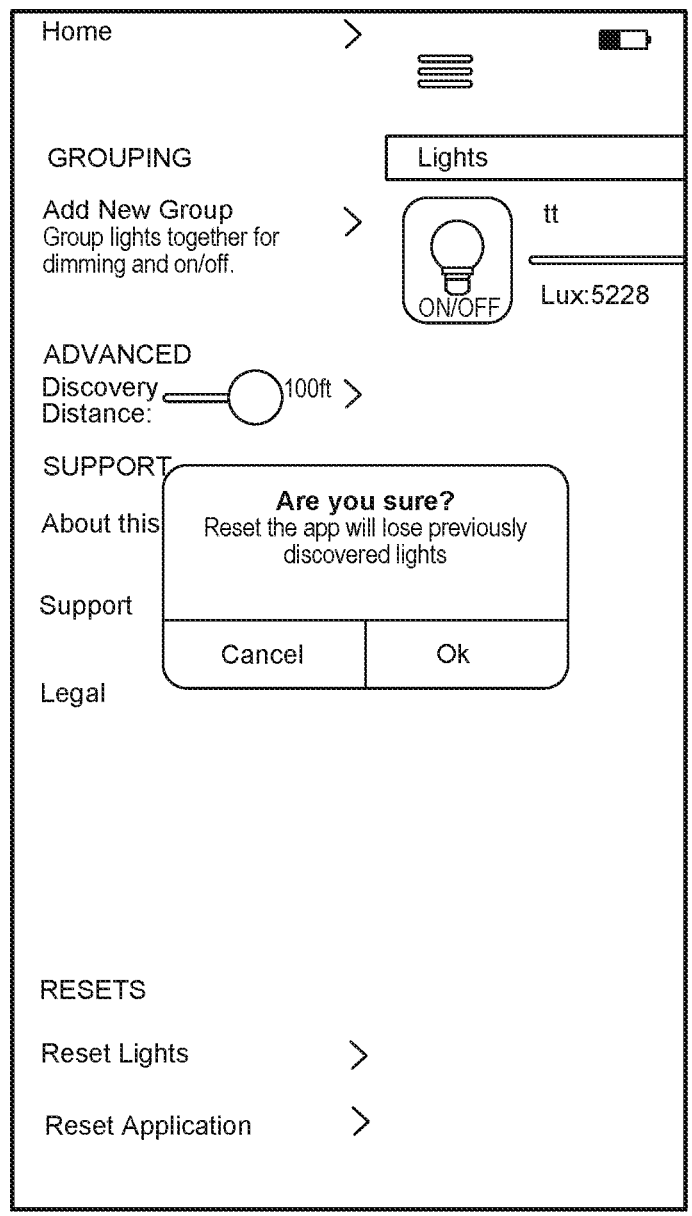
FIG. 10 is a second screenshot of a user interface implemented by a lamp commissioning application running on a mobile device for resetting lamp control units by authenticating with a backend server system, in accordance with various embodiments.

FIG. 10 is a second screenshot of a user interface implemented by a lamp commissioning application running on a mobile device for resetting lamp control units by authenticating with a backend server system, in accordance with various embodiments.

Figure 11:
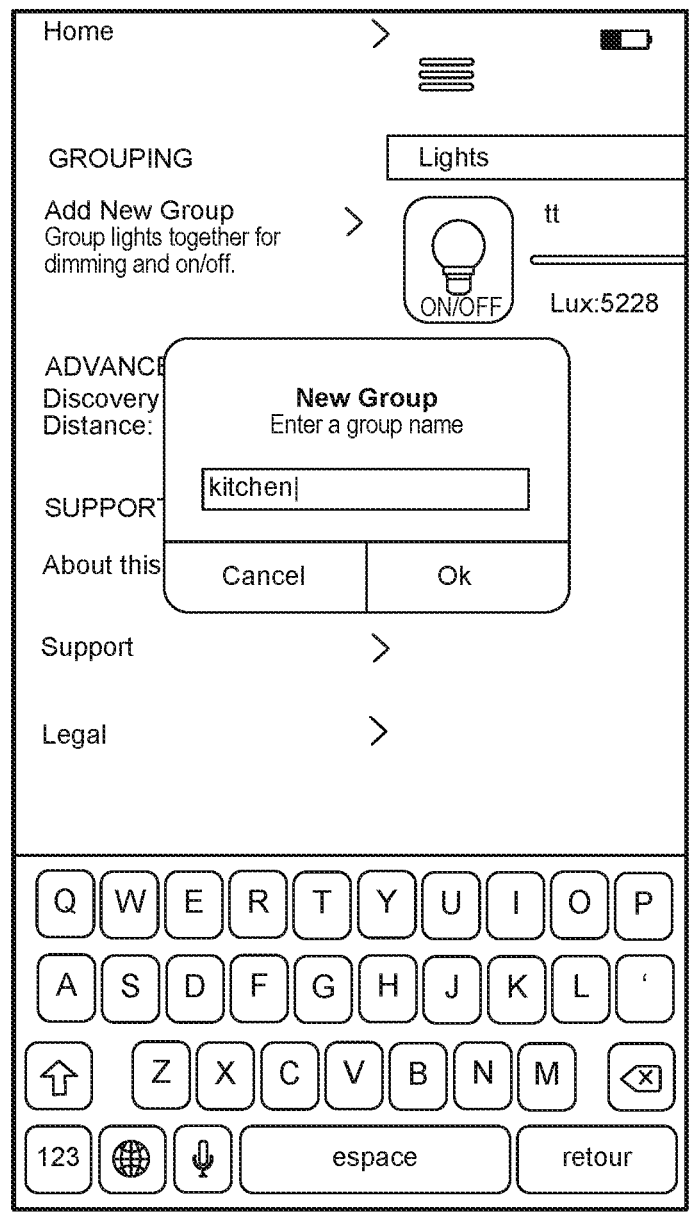
FIG. 11 is a first screenshot of a user interface implemented by a lamp commissioning application running on a mobile device for creating a commissioning control group of lamp control units, in accordance with various embodiments.

FIG. 11 is a first screenshot of a user interface implemented by a lamp commissioning application running on a mobile device for creating a commissioning control group of lamp control units, in accordance with various embodiments. FIG. 11 illustrates the creation of the group name.

Figure 12:
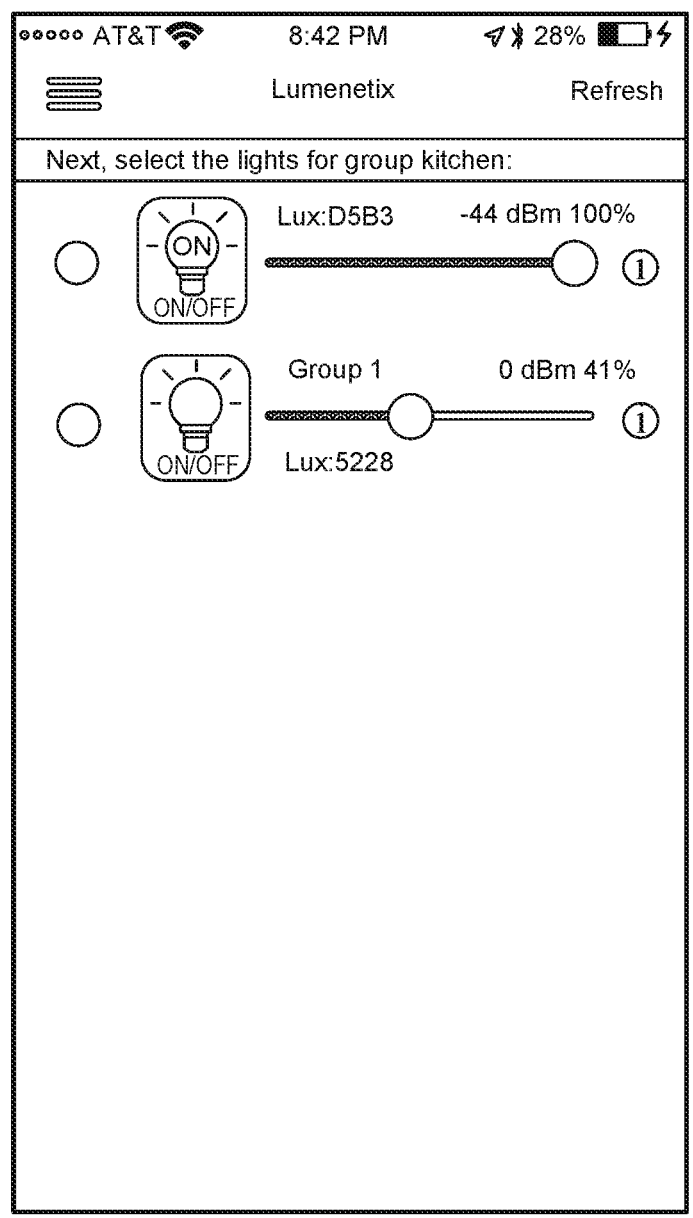
FIG. 12 is a second screenshot of a user interface implemented by a lamp commissioning application running on a mobile device for creating a commissioning control group of lamp control units, in accordance with various embodiments.

FIG. 12 is a second screenshot of a user interface implemented by a lamp commissioning application running on a mobile device for creating a commissioning control group of lamp control units, in accordance with various embodiments. FIG. 12 illustrates presentation of lamp control units for selection into the commissioning control group.

Figure 13:
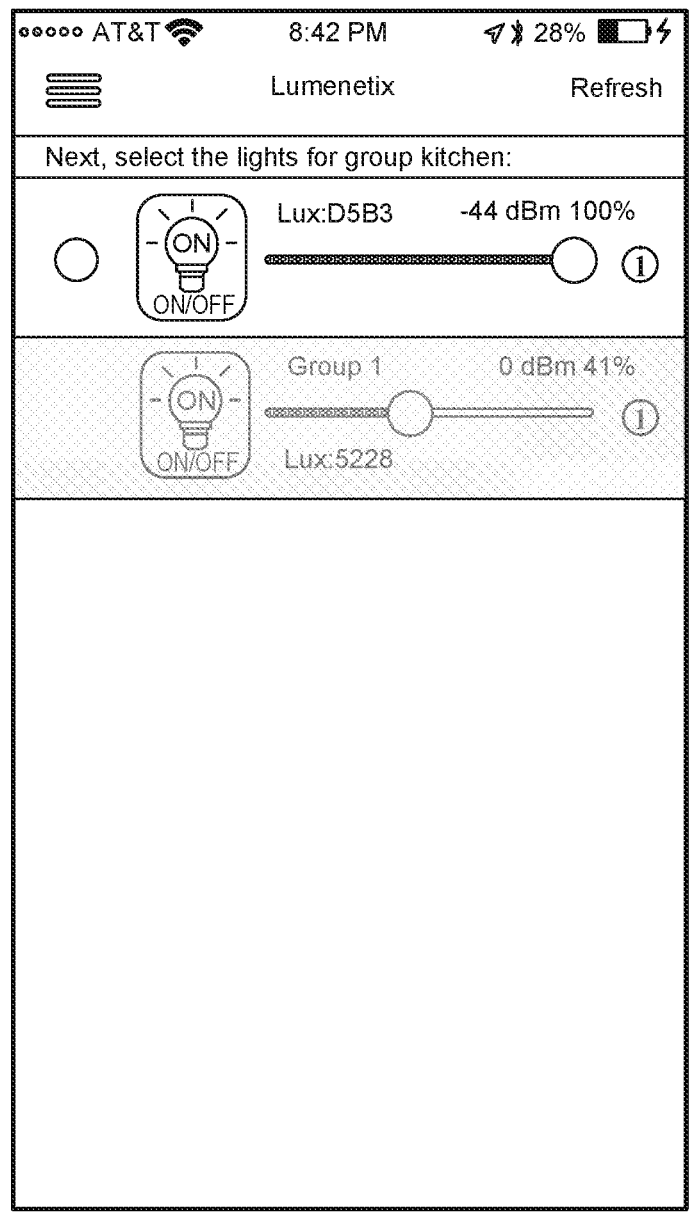
FIG. 13 is a third screenshot of a user interface implemented by a lamp commissioning application running on a mobile device for creating a commissioning control group of lamp control units, in accordance with various embodiments.

FIG. 13 is a third screenshot of a user interface implemented by a lamp commissioning application running on a mobile device for creating a commissioning control group of lamp control units, in accordance with various embodiments. FIG. 13 illustrates the selection of lamp control units to include in the commissioning control group.

Figure 14:
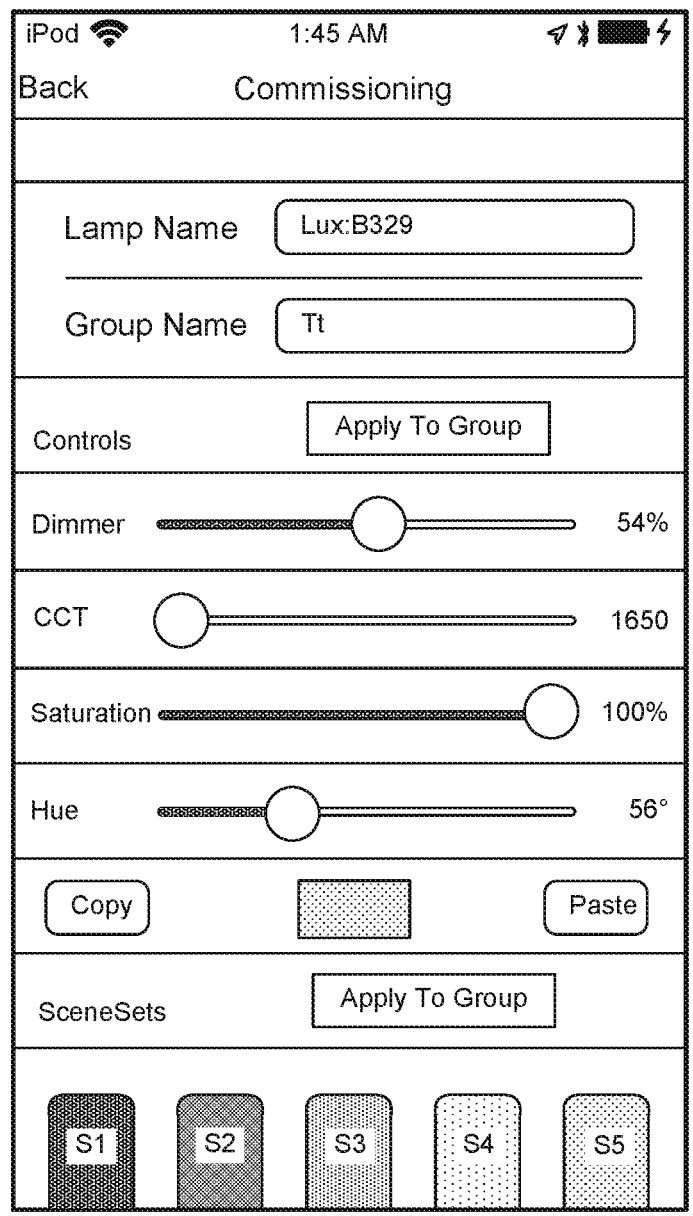
FIG. 14 is a first screenshot of a user interface implemented by a lamp commissioning application running on a mobile device for commissioning commissionable lighting parameters, in accordance with various embodiments.

FIG. 14 is a first screenshot of a user interface implemented by a lamp commissioning application running on a mobile device for commissioning commissionable lighting parameters, in accordance with various embodiments. FIG. 14 illustrates commissionable lighting parameters such as dimming percentage, CCT, saturation, and hue. FIG. 14 also illustrates the ability to copy a set of lighting characteristic and pasting it to the currently selected lamp control unit. FIG. 14 further illustrates presets of lighting parameters that can be applied to the lamp control unit.

Figure 15:
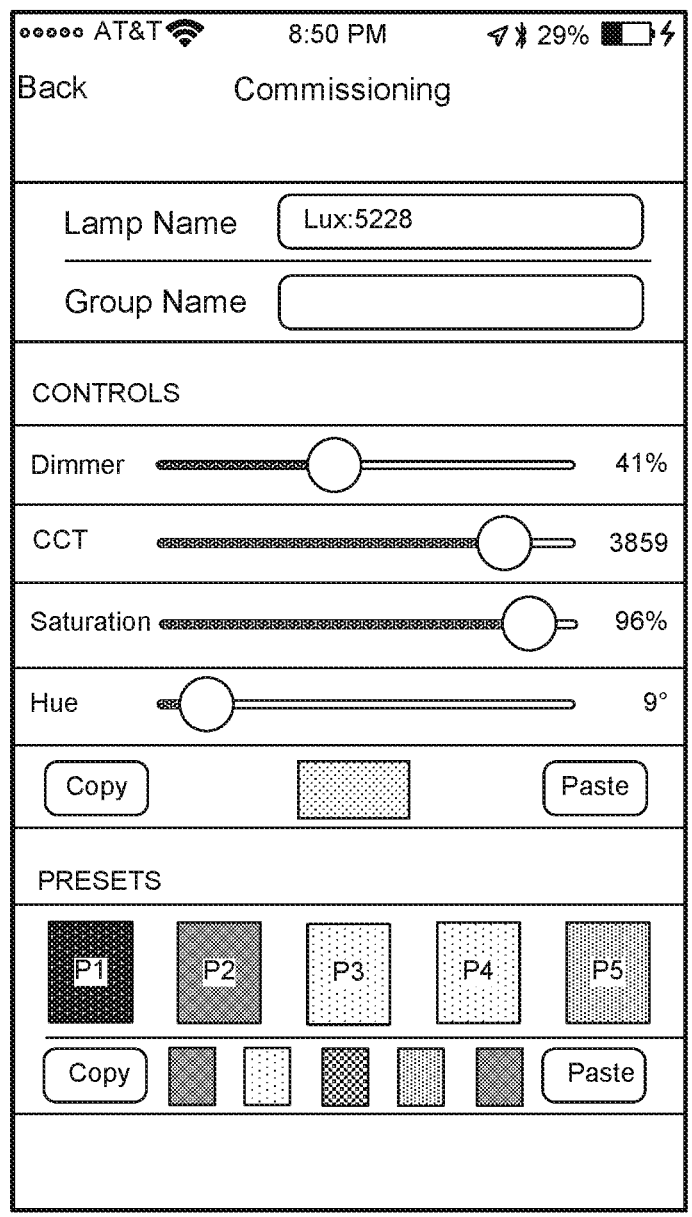
FIG. 15 is a second screenshot of a user interface implemented by a lamp commissioning application running on a mobile device for commissioning commissionable lighting parameters, in accordance with various embodiments.

FIG. 15 is a second screenshot of a user interface implemented by a lamp commissioning application running on a mobile device for commissioning commissionable lighting parameters, in accordance with various embodiments. FIG. 15 illustrates presentation of lighting parameter presets that can be selected during the operation of the lamp control unit (e.g., as an operational lighting parameter).

Figure 16:
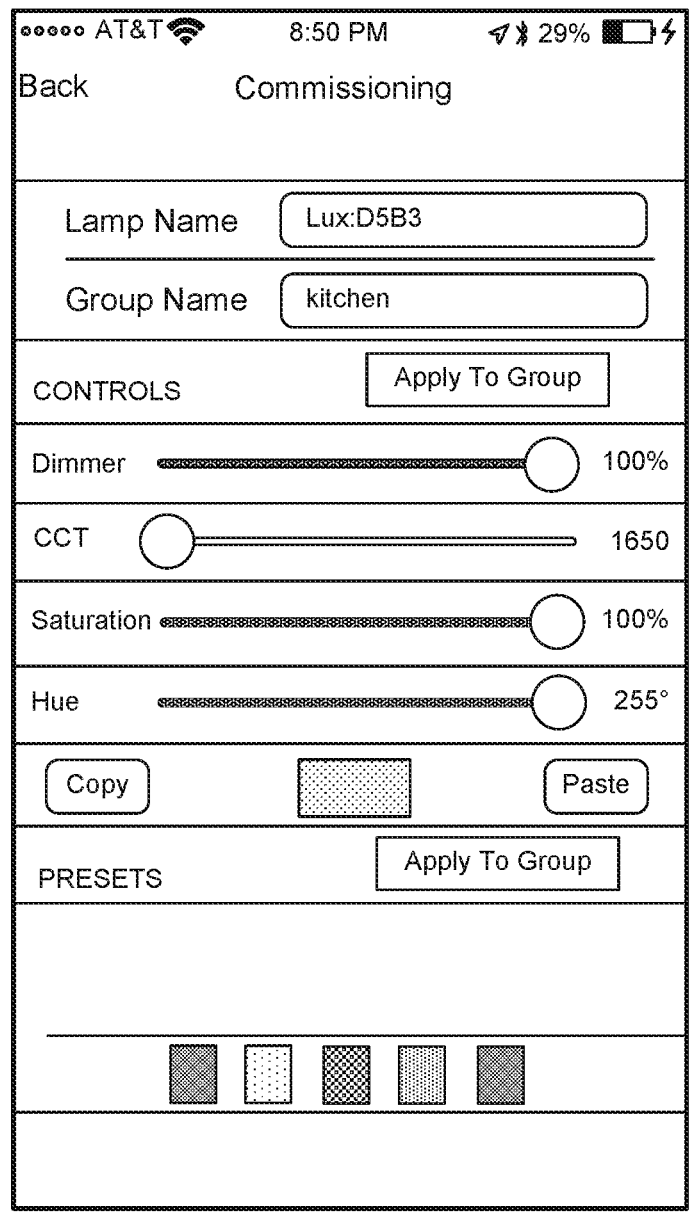
FIG. 16 is a third screenshot of a user interface implemented by a lamp commissioning application running on a mobile device for commissioning commissionable lighting parameters, in accordance with various embodiments.

FIG. 16 is a third screenshot of a user interface implemented by a lamp commissioning application running on a mobile device for commissioning commissionable lighting parameters, in accordance with various embodiments. FIG. 16 illustrates the lamp control unit without any commissioned presets.

Figure 17:
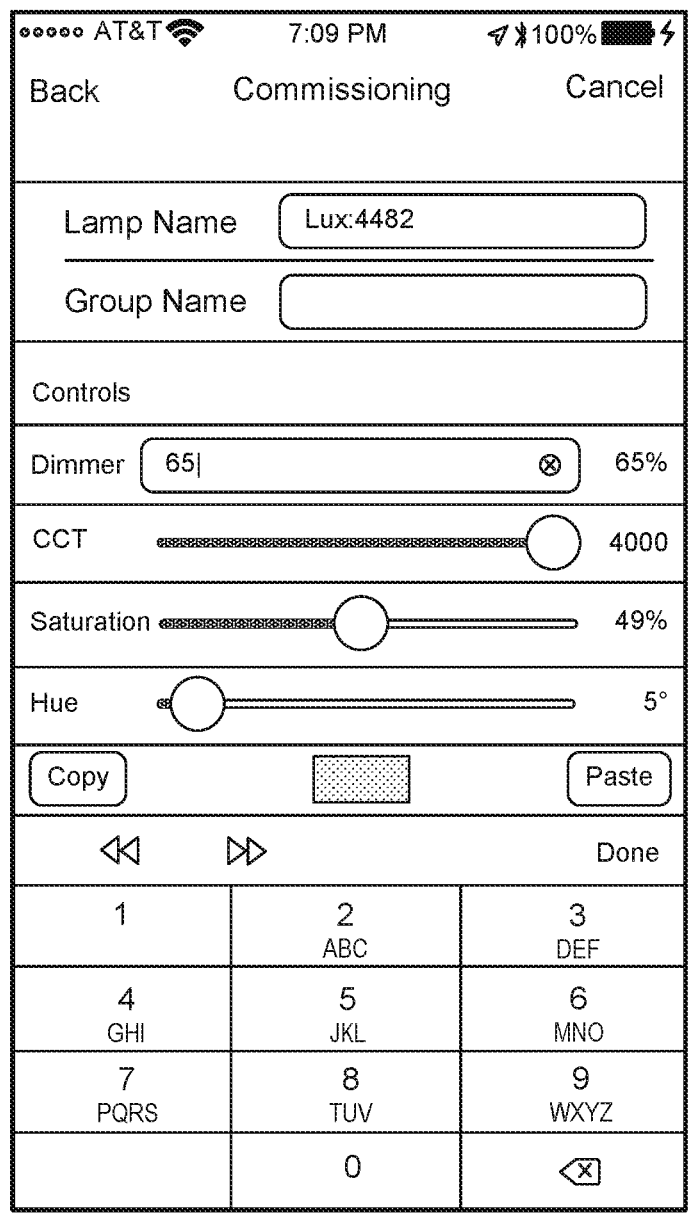
FIG. 17 is a fourth screenshot of a user interface implemented by a lamp commissioning application running on a mobile device for commissioning commissionable lighting parameters, in accordance with various embodiments.

FIG. 17 is a fourth screenshot of a user interface implemented by a lamp commissioning application running on a mobile device for commissioning commissionable lighting parameters, in accordance with various embodiments. FIG. 17 illustrates an installer user entering a default dimmer percentage on the user interface.

Figure 18:
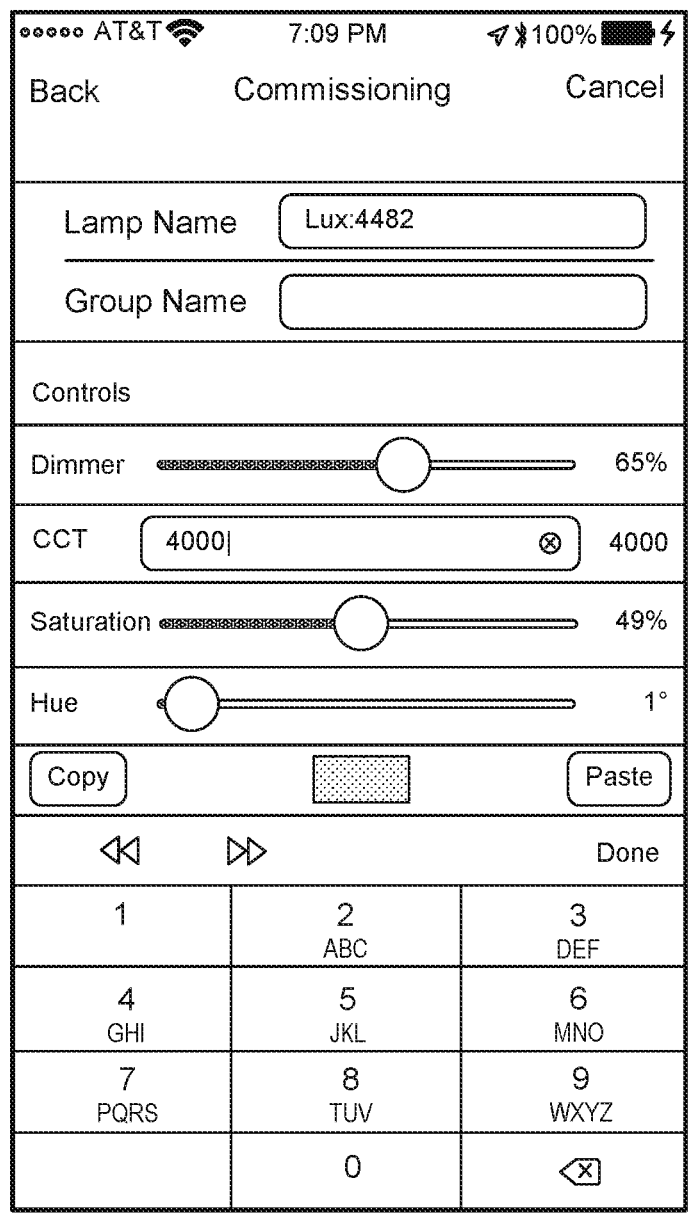
FIG. 18 is a fifth screenshot of a user interface implemented by a lamp commissioning application running on a mobile device for commissioning commissionable lighting parameters, in accordance with various embodiments.

FIG. 18 is a fifth screenshot of a user interface implemented by a lamp commissioning application running on a mobile device for commissioning commissionable lighting parameters, in accordance with various embodiments. FIG. 18 illustrates an installer user entering a default CCT on the user interface.

Figure 19:
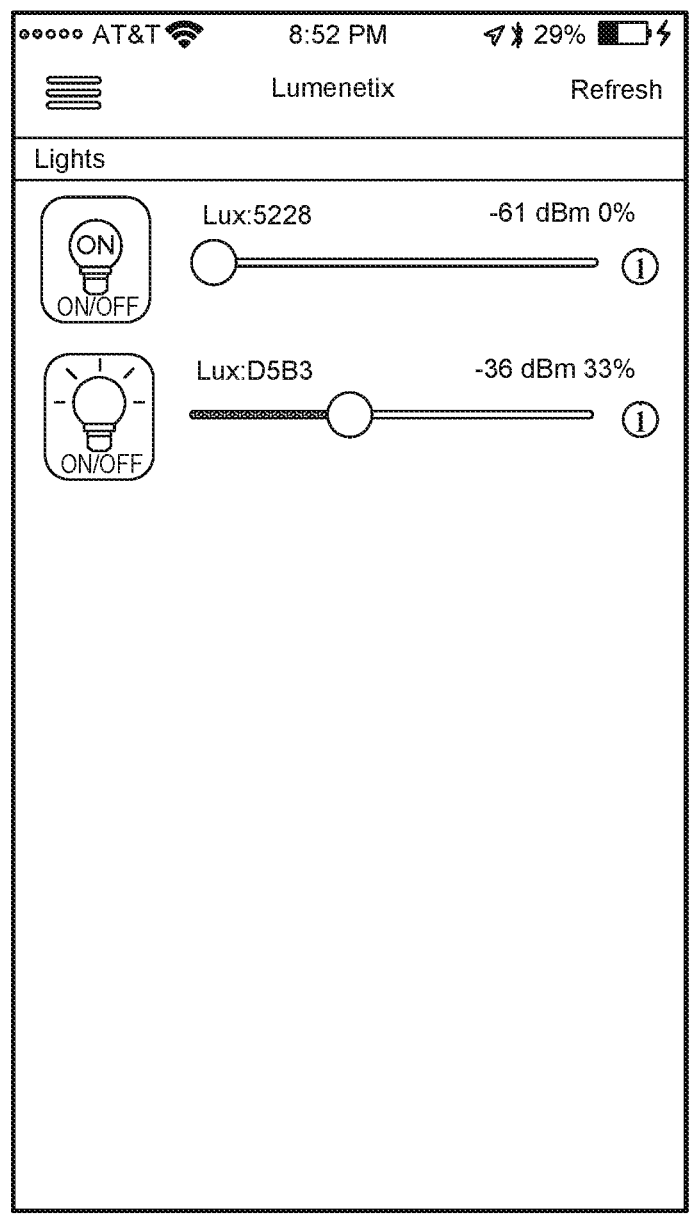
FIG. 19 is a first screenshot of a user interface implemented by a lamp commissioning application running on a mobile device for viewing lamp control units in the mobile device's vicinity, in accordance with various embodiments.

FIG. 19 is a first screenshot of a user interface implemented by a lamp commissioning application running on a mobile device for viewing lamp control units in the mobile device's vicinity, in accordance with various embodiments.

Figure 20:
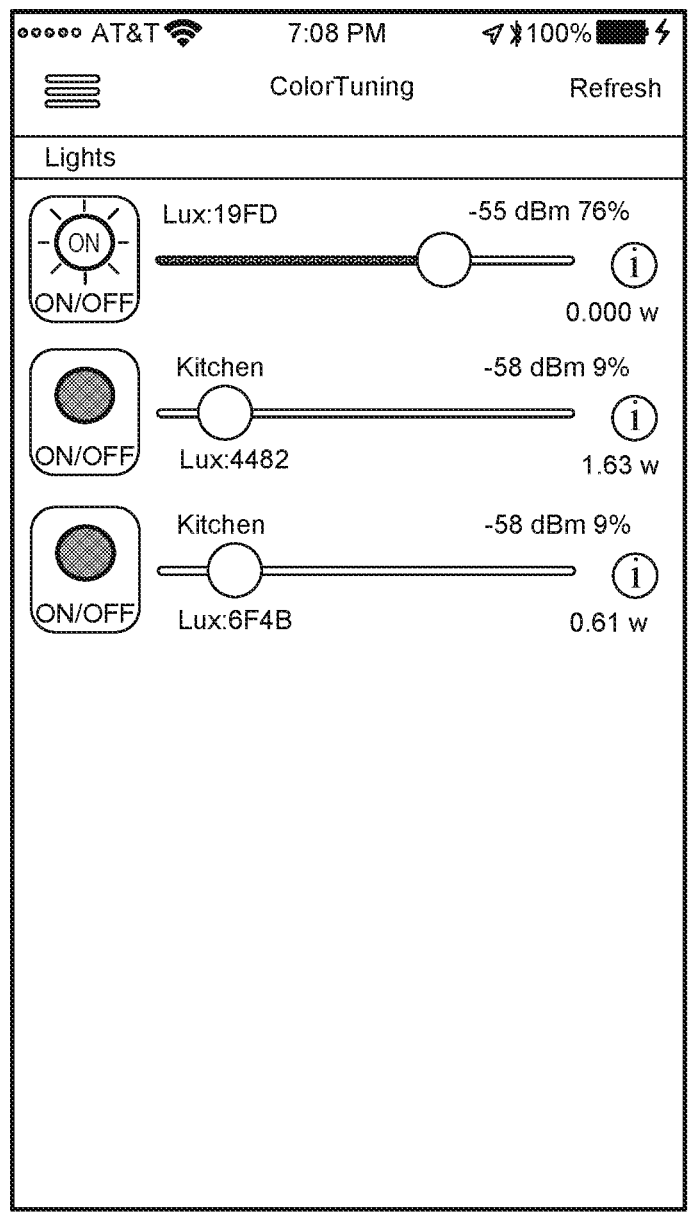
FIG. 20 is a first screenshot of a user interface implemented by a lamp commissioning application running on a mobile device for viewing lamp control units in the mobile device's vicinity, in accordance with various embodiments.

FIG. 20 is a first screenshot of a user interface implemented by a lamp commissioning application running on a mobile device for viewing lamp control units in the mobile device's vicinity, in accordance with various embodiments.

Figure 4:
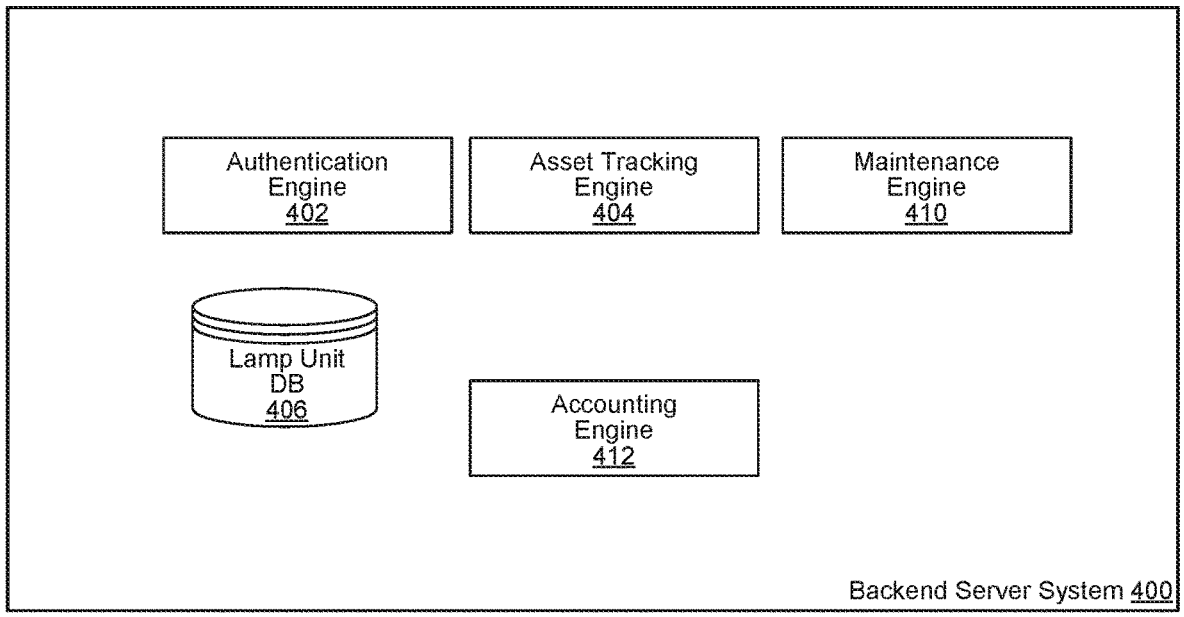
FIG. 4 is a block diagram of a backend server system that facilitates commissioning and servicing of one or more lamp units via a lamp commissioning application, in accordance with various embodiments.

FIG. 4 is a block diagram of a backend server system 400 that facilitates commissioning and servicing of one or more lamp control units (e.g., part of the light mixing lamp unit 200 of FIG. 2A and/or the lamp control unit 252 of FIG. 2B) via a lamp commissioning application (e.g., the lamp commissioning application 352 of FIG. 3), in accordance with various embodiments. The backend server system 400 includes at least an authentication engine 402 and an asset tracking engine 404. The authentication engine 402 can interface with one or more instances of the lamp commissioning application, for example, via an application programming interface (API). The authentication engine 402 can ensure that lamp control units being coupled to the mobile device are authentic lamp control units that are recognized by the backend server system 400. For example, the lamp control unit can provide a cryptographic token to the mobile device, and the mobile device can in turn deliver to the authentication engine 402 to verify cryptographically. The authentication engine 402 can also ensure that the lamp commissioning applications are authorized applications instead of malicious programs. To do so, the authentication engine 402 can verify a security token provided from the lamp commissioning application.

In some embodiments, the authentication engine 402 can maintain an association between an instance of the lamp commissioning application and one or more lamp control units (e.g., part of or separate from lamp units) controlled by the lamp commissioning application instance. The authentication engine 402 can store a login associated with a passcode that can be used by the lamp commissioning application instance to verify its authenticity. For example, the lamp commissioning application can provide the login and the passcode to the authentication engine 402, and in turn, the authentication engine 402 can return a security token (e.g., a session-based token or cryptographic signature) to the lamp commissioning application. In turn, the lamp commissioning application can verify the security token and send a secret string to its lamp control units, where the secret string is recognizable and verifiable by the lamp control units. In some embodiments, the security token is the secret string. When the lamp control units recognizes and verifies the security token, then they can expose control and access to its functions, parameters, and data to the lamp commissioning application instance. In several embodiments, the security token employed by the authentication engine 402 prevents exploitative activities, such as a fake application that attempts to communicate with the lamp control units, a fake application that attempts to communicate with the backend server system 400, or an exploiter operated lamp commissioning application attempting to couple with a lamp control unit belonging to someone else, etc.

The asset tracking engine 404 can track lamp control units reported by one or more lamp commissioning application instances. For example, the asset tracking engine 404 can maintain a lamp unit database 406 storing one or more parameters, measurements, configurations, attributes, or any combination thereof, of the tracked lamp control units. In some embodiments, the asset tracking engine 404 enables the backend server system 400 to crowd source lamp unit optimization data to compute a calibration parameters for different lamp units and/or to compute the color mixing models for different lamp control units.

In several embodiments, the lamp control units can report the following feedback data to its assigned lamp commissioning application: lamp unit temperature, lamp unit color drift, lamp unit history data, lamp unit location data, lamp unit health data, lamp unit power consumption data, lamp unit configuration data, or any combination thereof. In some embodiments, all of the feedback data reported to the lamp commissioning application is also reported by the lamp commissioning application to the backend server system 400. In some embodiments, at least a subset of the feedback data is maintain on the lamp commissioning application only in accordance with a user provided privacy setting. Based on the feedback data, either the lamp commissioning application or a maintenance engine 410 of the backend server system 400 can provide calibration and maintenance updates to the lamp control units. Calibration, for example, includes fixing color drifting due to temperature fluctuation, LED deterioration, and/or optics (e.g., plastic cap of the LEDs) deterioration.

In some embodiments, the backend server system 400 includes an accounting engine 412. The accounting engine 412 can communicate with the asset tracking engine 404 and the maintenance engine 410 to determine whether a user account associated with a lamp commissioning application has been fully utilizing the services provided by the asset tracking engine 404 and/or the maintenance engine 410. The accounting engine 412, for example, may generate a bill for the services provided to a login user from the lamp commissioning application.

In some embodiments, the lamp commissioning application and/or the lamp control units can implement a digital rights management (DRM) that protects the data therein from being extracted or used by other devices. For example, for a failure to pay for a service, the accounting engine 412 can disable a lamp commissioning application or a control engine of a lamp control unit remotely utilizing the DRM mechanism.

Physical and functional components (e.g., devices, engines, modules, and data repositories, etc.) associated with the devices and systems in this disclosure can be implemented as circuitry, firmware, software, functional instructions, other executable instructions, or any combination thereof. Some or all of the components may be combined as one component. A single component may be divided into sub-components, each sub-component performing separate function, method step, functions, or method steps of the single component.

For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 5:
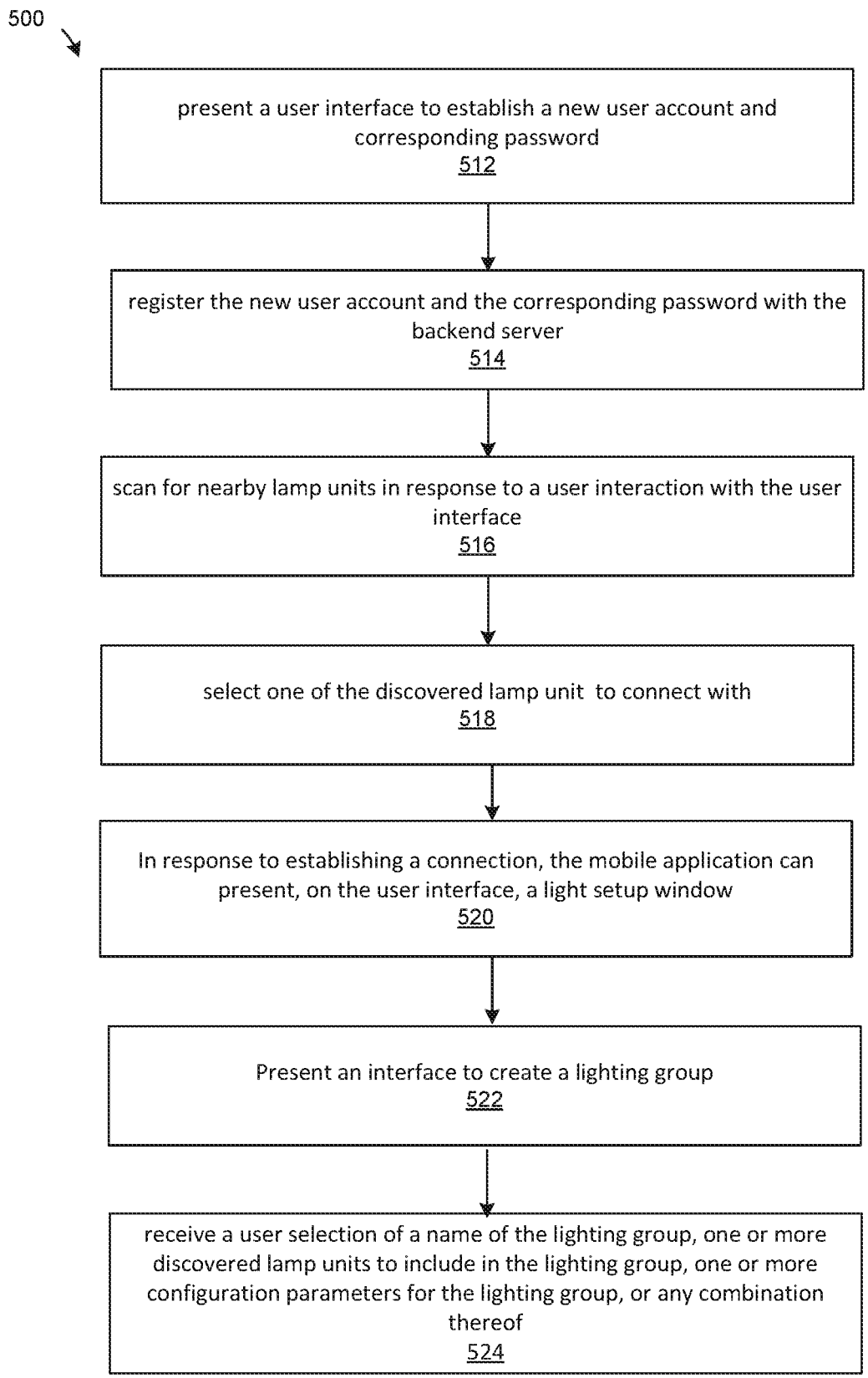
FIG. 5 is a flowchart illustrating a method of operating a mobile device to commission a lamp control unit, in accordance with various embodiments.

FIG. 5 is a flowchart illustrating a method 500 of operating a mobile device (e.g., the mobile device 300 of FIG. 3) to commission a lamp control unit (e.g., part of the light mixing lamp unit 200 of FIG. 2A or the lamp control unit 252 of FIG. 2B), in accordance with various embodiments. The method 500 may involve a lamp commissioning application (e.g., the lamp commissioning application 352 of FIG. 3), the lamp control unit, and a backend server (the backend server system 400 of FIG. 4).

At step 512, the lamp commissioning application can present a user interface to establish a new user account and corresponding password. At step 514, the lamp commissioning application can register the new user account and the corresponding password with the backend server. At step 516, the lamp commissioning application can scan for nearby lamp units in response to a user interaction with the user interface. For example, the lamp commissioning application can initiate a Bluetooth discovery protocol to connect with known device types associated with known lamp units.

At step 518, the lamp commissioning application can select one of the discovered lamp unit, such as the lamp unit, to connect with. In response to establishing a connection, at step 520, the lamp commissioning application can present, on the user interface, a light setup window. The light setup window, for example, enables the operating user to reset parameters of the lamp unit, reset a lamp unit password that protects the lamp unit against unauthorized access, configure the lamp unit, perform maintenance update on the lamp unit, or any combination thereof.

In some embodiments, the lamp commissioning application can present, at step 522, an interface to create a lighting group. For example, at step 524, the lamp commissioning application can receive a user selection of a name of the lighting group, one or more discovered lamp units to include in the lighting group, one or more configuration parameters for the lighting group, or any combination thereof.

In some embodiments, the lamp unit can be commission initially via Bluetooth and later controlled by a building's wired connection. For example, after step 520, the operating user of the lamp commissioning application can set up the lamp unit wired connection control (e.g., control signal from a digital or an analog dimmer or input voltage control). For example, the lamp unit can be controlled by a dimmer. The user interface enables the operating user to select along which color dimension (e.g., CCT, hue, saturation, intensity, etc.) that the wired connection control can adjust.

Figure 6:
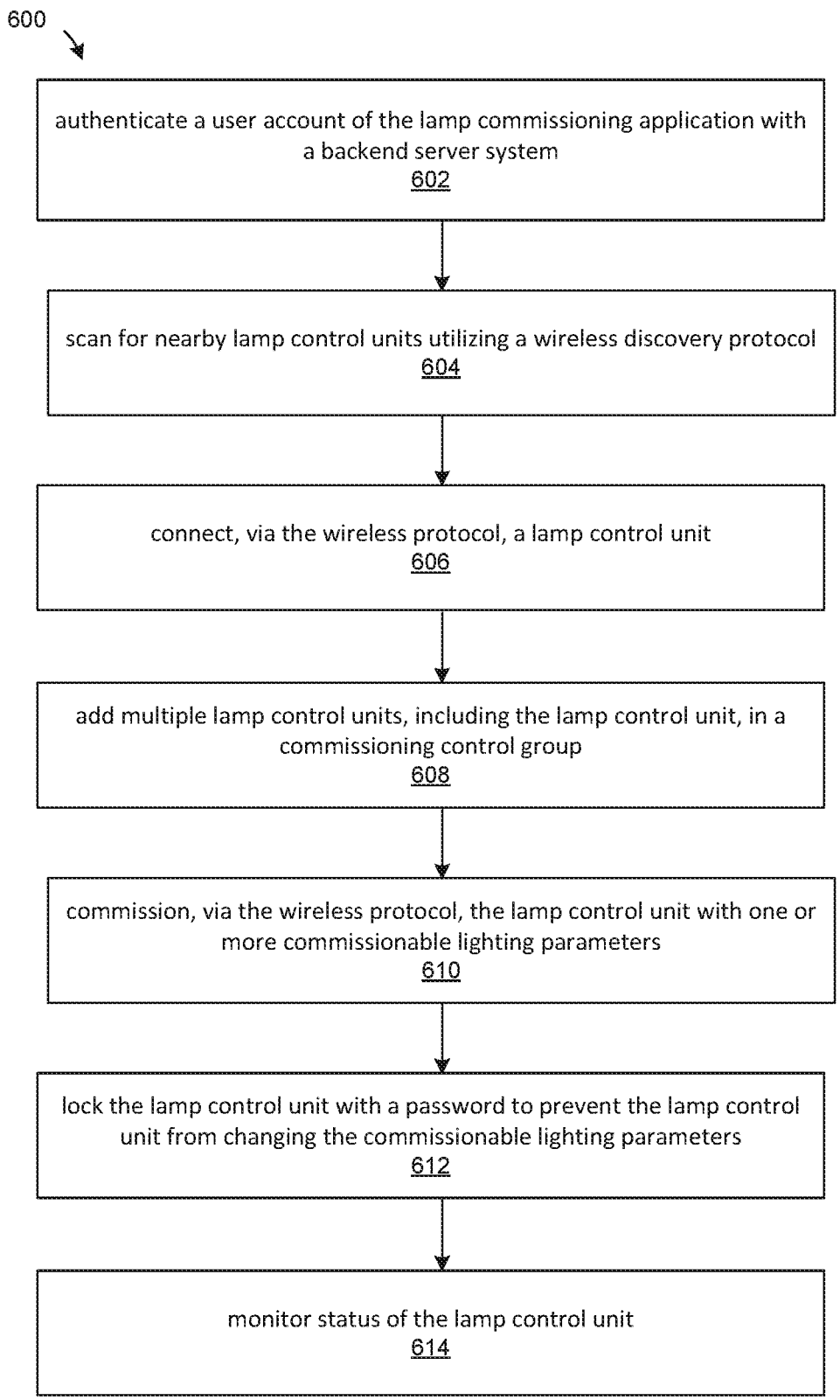
FIG. 6 is a flowchart illustrating a method of operating a lamp commissioning application of a mobile device to configure of a lamp control unit, in accordance with various embodiments.

FIG. 6 is a flowchart illustrating a method 600 of operating a lamp commissioning application (e.g., the lamp commissioning application 352 of FIG. 3) of a mobile device (e.g., the mobile device 300 of FIG. 3) to configure of a lamp control unit (e.g., part of the light mixing lamp unit 200 of FIG. 2A or the lamp control unit 252 of FIG. 2B), in accordance with various embodiments. The lamp control unit can be part of a lamp (e.g., an LED-based lamp) or be coupled to at least one lamp (e.g., an LED-based lamp). In some embodiments, the lamp control unit is an external control module for at least one lamp. In some embodiments, the lamp control unit can be coupled to multiple lamps.

Optionally at step 602, the mobile device can authenticate a user account of the lamp commissioning application with a backend server system (e.g., the backend server system 400 of FIG. 4) to verify that the lamp commissioning application has permission to commission one or more lamp control units (e.g., via a wireless protocol, such as the Bluetooth protocol). For example, the user account can be authenticated via user-specified login and password. The lamp commissioning application can send a user-entered password (e.g., received via the user interface of the lamp commissioning application) to a backend server system. The lamp commissioning application can then receive a message from the backend server system. The message can contain a security token/cryptographic signature that enables the lamp commissioning application to send a secret string to one or more lamp control units to claim ownership of the lamp control units and to enable the lamp commissioning application to set a user-specified password. The secret string can enable the mobile device to lock the lamp control units.

At step 604, the mobile device can scan for nearby lamp control units utilizing a wireless discovery protocol, such as a Bluetooth discovery protocol. The mobile device can present the available lamp control units for selection on the lamp commissioning application. At step 606, the lamp commissioning application can connect, via the wireless protocol, a lamp control unit. The lamp commissioning application can connect to multiple lamp control units simultaneously. In some embodiments, the number of simultaneous connections is limited by the wireless protocol.

The lamp commissioning application can generate a user interface (e.g., on a touchscreen of the mobile device) to facilitate commission of the lamp control units. Optionally, at step 608, the lamp commissioning application can add multiple lamp control units, including the lamp control unit, in a commissioning control group. At step 610, the lamp commissioning application can commission, via the wireless protocol, the lamp control unit with one or more commissionable lighting parameters. If step 608 is performed, the lamp commissioning application can commission all of the lamp control units in the control group simultaneously. The lamp commissioning application can receive the commissionable lighting parameters on a user interface (e.g., on the touchscreen of the mobile device). In some embodiments, the lamp commissioning application can identify the commissionable lighting parameters from a data storage memory of the mobile device.

In some cases, the lamp control unit is in a locked state of a close mode. In the close mode, the lamp control unit transitions from a locked state to an unlocked state in response to receiving an input entry that matches the encrypted passcode stored as a first characteristic field in an attribute profile of the lamp control unit. For example, the attribute profile can be an attribute profile of the wireless protocol, such as Bluetooth protocol's generic attribute profile (GATT). The lamp control unit can automatically return to the locked state after commissioning is completed.

At step 612, the lamp commissioning application can lock the lamp control unit with a password to prevent the lamp control unit from changing the commissionable lighting parameters. For example, step 612 causes the lamp control unit to change from an open mode to the close mode.

In some embodiments, to return the lamp control unit from the close mode to the open mode, the lamp commissioning application sends a secret string to the lamp control unit to reset the lamp control unit. The lamp commissioning application may be required to authenticate itself with the backend server system to enable sending of the secret string. For example, an installer user may be given a "master password" by the manufacturer of the lamp control units. The lamp commissioning application can query the installer user to enter the master password. The lamp commissioning application can verify the master password with the backend server system. The backend server system can change the master password at any given time, such that any previously given master passwords become obsolete. Once the master password is verified, the lamp commissioning application can receive a security token from the backend server system. The security token unlocks a secure portion of the lamp commissioning application to enable sending of the secret string to the lamp control unit to reset the lamp control unit.

At step 614, the lamp commissioning application can monitor status of the lamp control unit. For example, the status can include the current setting of the commissionable lighting parameters, the current setting of the operational lighting parameters, identifier of an installer user account associated with the password that locks the lamp control unit, the security status (e.g., open or close mode and/or locked or unlocked state) of the lamp control unit, or any combination thereof. For example, the lamp commissioning application can show the status as an icon on the user interface render on the mobile device. The icon can be a light bulb that displays the color temperature, hue, and/or dimming percentage of one or more lamp units coupled to the lamp control unit. The icon can also illustrate whether the lamp control unit is turned on or off.

The lamp commissioning application can be a commissioning tool implemented as an application running on the mobile device. The lamp commissioning application can be used by an installer user to tweak and fine tune the light output of the one or more lamps coupled to the lamp control unit such that the light output matches customer specification. At least a subset of the commissionable lighting parameters can only be set via the wireless protocol. Once one or more parameters in the subset are set, the lamp commissioning application can prevent access to changes to the parameters in the subset. Other parameters, such as the operational lighting parameters, can be changed via a control interface (e.g., a wired wall switch or dimmer panel) even after the lamp control unit is locked by a password.

Figure 7:
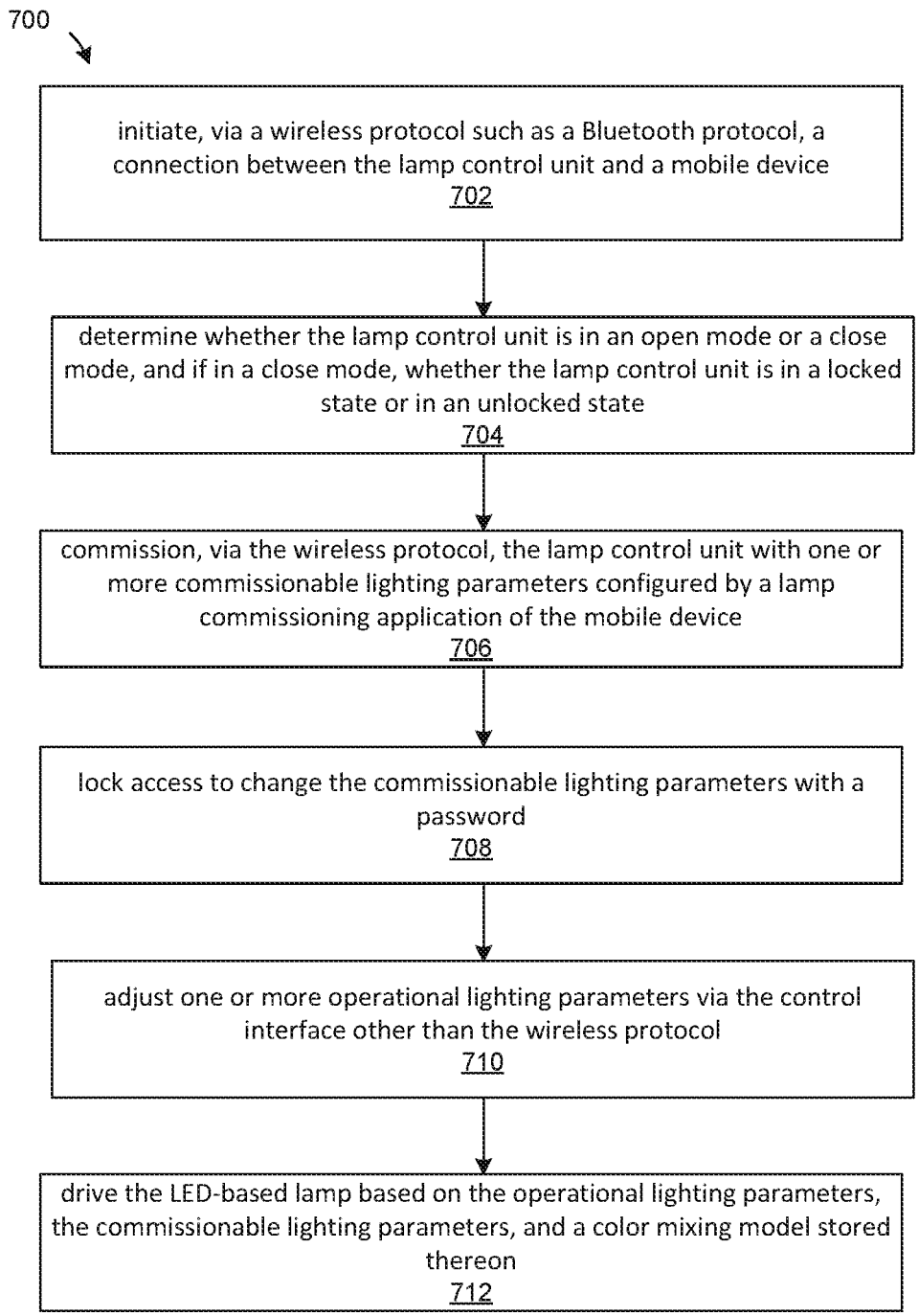
FIG. 7 is a flowchart illustrating a method of operating a lamp control unit, in accordance with various embodiments.

FIG. 7 is a flowchart illustrating a method 700 of operating a lamp control unit (e.g., part of the light mixing lamp unit 200 of FIG. 2A or the lamp control unit 252 of FIG. 2B), in accordance with various embodiments. The lamp control unit can be part of a lamp (e.g., an LED-based lamp) or be coupled to at least one lamp (e.g., an LED-based lamp). In some embodiments, the lamp control unit is an external control module for at least one lamp. In some embodiments, the lamp control unit can be coupled to multiple lamps.

At step 702, the lamp control unit can initiate, via a wireless protocol such as a Bluetooth protocol, a connection between the lamp control unit and a mobile device (e.g., the mobile device 300 of FIG. 3). At step 704, the lamp control unit determine whether the lamp control unit is in an open mode or a close mode, and if in a close mode, whether the lamp control unit is in a locked state or in an unlocked state. The open mode enables the lamp control unit to accept a new passcode to lock one or more commissionable lighting parameters of the lamp control unit. The close mode prevents the lamp control unit from changing the commissionable lighting parameters when in a locked state and enables the lamp control unit to change the commissionable lighting parameters when in an unlocked state. The commissionable lighting parameters can include a security parameter (e.g., a password to lock the lamp control unit), a grouping parameter (e.g., indication of a commissioning control group), a calibration parameter (e.g., adjustments to a light mixing model), a light characteristic parameter (e.g., a value representative of correlated color temperature, hue, and/or saturation), an available preset configuration (e.g., identification of groups of light characteristic parameters, where a single group can be selected via a control interface separate from the wireless protocol), or any combination thereof. In some embodiments, the commissionable lighting parameters can include specification of what lighting characteristics can be controlled by operational lighting parameters (e.g., parameters that are controlled by the control interface, such as a wired wall dimmer interface, other than the wireless protocol).

At step 706, the lamp control unit can commission, via the wireless protocol, the lamp control unit with one or more commissionable lighting parameters configured by a lamp commissioning application of the mobile device. The lamp commissioning application can receive the commissionable lighting parameters as user inputs on the mobile device. The lamp control unit can provide default lighting parameters to the mobile device such that an installer user knows what the current setting of the lighting parameters is. Commissioning can include defining lighting configuration parameters that can be selected as one or more preset lighting configurations after the lamp control unit is deployed. A preset can be selected after deployment of the lamp control unit using the control interface. A preset can include customizable commissioning values (e.g., dimness level, CCT, saturation, hue, or any combination thereof) that can be set and recall quickly.

Commissioning can include mapping a Digital Multiplex (DMX) channel to control a lighting characteristic (e.g., CCT, hue, brightness, or a combination thereof) of light outputted by the lamp. The DMX channel can be in accordance with a lighting equipment control standard, such as the DMX512 standard.

Commissioning can include specifying an animation defined by a function of changing lighting characteristic(s), operational lighting parameter(s), and/or commissionable lighting parameter(s). The animation can be a customizable sweep of any commissionable value(s). For example, one can set minimum and/or maximum operational lighting parameter values (e.g., dim, CCT, saturation, hue, or any combination thereof), and make them automatically increment (or decrement) of a certain amount based on time. For instance, one can set animation on hue over a 1 minute period. This would make the light change color and repeat every minute. Optionally, one can set a non-linear repeat pattern. The commissionable lighting parameter can also specify, when an operational lighting parameter value reach the maximum (or minimum), how the value should start again (e.g., from the start (or maximum) or simply return to the minimum (or maximum)). The commissionable lighting parameter can also set how many times they want the animation to repeat for a given session. In a specific example, the animation can include changing CCT value only from 8 am to 10 pm from a minimum to a maximum (e.g., user configurable) till 12:30 pm, then revert back to minimum till 11 pm. The animation can be on repeat (e.g., looping) or not.

At step 708, the lamp control unit can lock access to change the commissionable lighting parameters with a password. If the lamp control unit is in the open mode (e.g., with no previous password locks the lamp control unit), the mobile device can specify a new password that locks the lamp control unit. For example, the lamp control unit can receive a new passcode entry via the wireless protocol. The lamp control unit can store the new passcode entry as an encrypted string in a first characteristic field (e.g., a "room name" field) of an attribute profile of the lamp control unit, such as a Bluetooth attribute profile. For example, the Bluetooth attribute profile can be the Generic Attribute Profile (GATT) in accordance with the Bluetooth protocol.

Once the new password is set, the lamp control unit transitions to the close mode. In the close mode, the lamp control unit transitions from a locked state to an unlocked state in response to receiving an input entry that matches the encrypted passcode stored as the first characteristic field in the attribute profile of the lamp control unit. For example, the commissioning of step 706 can be in response to verifying the input entry against the encrypted passcode. In some embodiments, to notify the mobile device that authentication either failed or succeeded, the lamp control unit can write a value, indicative of authentication's failure or success, into a second character field in the attribute profile. The mobile device can read the second character field via the wireless protocol, and determine that the lamp control unit is in the unlocked state, and is ready to receive commands and commissionable lighting parameters.

In some embodiments, to return the lamp control unit from the close mode to the open mode, the lamp control unit has to verify receipt of a secret string from the lamp commissioning application. For example, the lamp control unit can receive an input string for a third characteristic field of the attribute profile stored in the lamp control unit. The lamp control unit can compare the input string to the secret string configured to enable a reset procedure. In response to matching the input string to the secret string, the lamp control unit can reset the lamp control unit to the open mode such that any passcode (e.g., stored in the attribute profile) locking the lamp control unit is erased or reset to a default string. In some embodiments, the third characteristic field is a different characteristic field from the first characteristic field for storing the password. In some embodiments, the first characteristic field is the third characteristic field. The secret string can include an encrypted string, a hash value based on a seed value known to the lamp commissioning application and the lamp control unit, a preset string, a rotating token that changes based on a schedule or a wireless connection session, or any combination thereof. In some embodiments, as the lamp control unit is reset by the secret string, any commissioning control group assignment is also cleared. One or more commisionable lighting parameters (e.g., lighting characteristics, presets, preset toggle mode, and DMX channels) are reset to default values.

At step 710, the lamp control unit can adjust one or more operational lighting parameters via the control interface other than the wireless protocol. The capability to adjust the operational lighting parameters can be enabled only after commissioning of the commissionable lighting parameters. In some embodiments, the commissionable lighting parameters dictate available values of the operational lighting parameters. The control interface can be a wired interface connected to a dimmer panel or a digital multiplex (DMX) panel. Adjusting the operational lighting parameters can include selecting one of the preset lighting configurations to configure color channels of a lamp coupled to the lamp control unit. For example, the lamp control unit can be operated in a "preset toggle mode" after deployment. The control interface can be a wired analog interface (e.g., a slider-based wall dimmer) that receives an input signal of 0 to 10V. For example, the lamp control unit can be configured to toggle between preset 1 to preset 5 based on 2 volt increments of the slider position on the wall dimmer. In a specific example, the presets correspond to different CCT values.

In some embodiments, the commissionable lighting parameters dictate available values of the operational lighting parameters. In some embodiments, the operational lighting parameters are a subset of the commissionable lighting parameters. In some embodiments, the operational lighting parameters are mutually exclusive from the commissionable lighting parameters. For example, the commissionable lighting parameters can include definition of presets, definition of DMX channels, definition of lamp groups, naming of the lamp control unit, CCT value, definition of lighting animation, default CCT/hue/saturation/brightness, or any combination thereof. For example, the operational lighting parameters can include turning the lamp control unit on and off, dimming (e.g., brightness) level control, preset selection, turning animation on/off, or any combination thereof.

At step 712, the lamp control unit can drive the LED-based lamp based on the operational lighting parameters, the commissionable lighting parameters, and a color mixing model stored thereon. The commissionable lighting parameters and the operational lighting parameters are saved in a data storage memory of the lamp control unit. The lamp control unit can drive its color channels based on the commissionable lighting parameters, the operational lighting parameters, and the color mixing model. In case of a power cycle (e.g., turning the lamp control unit off then on), the lamp control unit can restore the last configured lighting parameter values when the power is turned back on. In some embodiments, the commissionable lighting parameters are saved as the raw values received via the wireless protocol. In some embodiments, the commissionable lighting parameters are translated into other digitized or analog units before being stored in the data storage memory.

While processes or blocks are presented in a given order in the figures, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification. Reference in this specification to "various embodiments," several embodiments, or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

Some embodiments include a lamp control unit. The lamp control unit can include a first communication interface (e.g., a wireless digital interface) and a second communication interface (e.g., wired analog interface or another digital interface). The lamp control unit can include a driver system for controlling three or more color channels for a lamp. The lamp control unit can include a memory configured to store a color mixing model that specifies flux ratios associated with the color channels to achieve one or more lighting characteristics under one or more known operating conditions while satisfying one or more lighting performance criteria. The lamp control unit can include a control circuitry (e.g., including a processor or a controller) configured to: receive, via a wireless protocol, one or more commissionable lighting parameters from a mobile device; lock access to the commissionable lighting parameters with a password to prevent change to the commissionable lighting parameters; adjust one or more operational lighting parameters via a wired control interface; and compute flux ratios for the drive system to control the color channels of the lamp based on the operational lighting parameters, the commissionable lighting parameters, and the color mixing model. The driver system can be configured to generate a digital control signal indicating the flux ratios corresponding to the color channels. The driver system can be configured to generate an analog control signal indicating the flux ratios corresponding to the color channels.

What is claimed is:

1. A computer-implemented method comprising: initiating, via a Bluetooth protocol, a connection between a lamp control unit for a light-emitting diode-based (LED-based) lamp and a mobile device;
commissioning, via the Bluetooth protocol, the lamp control unit with a commissionable lighting parameter of a plurality of commissionable lighting parameters configured to be adjusted by a user via a lamp commissioning application executing in the mobile device, wherein the commissionable lighting parameter:
specifies which one of lighting characteristics can be controlled by one or more operational lighting parameters, an operational lighting parameter of the one or more operational lighting parameters being configured to be adjusted by a control interface other than the mobile device to control a lighting characteristic of the LED-based lamp, and
dictates available values of the operational lighting parameter for adjustment by the control interface;

locking the lamp control unit with a password to prevent the lamp control unit from changing the commissionable lighting parameter;

in response to the commissioning by the mobile device, adjusting the operational lighting parameter based on an input received via the control interface;

controlling the LED-based lamp based on the adjusted operational lighting parameter in compliance with the commissionable lighting parameter;

receiving a first input string for a first characteristic field of a Bluetooth attribute profile stored in the lamp control unit;

comparing the first input string to a secret string configured to enable a reset procedure; and resetting the lamp control unit to an open mode such that any passcode stored in the Bluetooth attribute profile is erased.

2. The computer-implemented method of claim 1, wherein the adjusting is enabled only after the commissioning of the commissionable lighting parameter.

3. The computer-implemented method of claim 1, further comprising:

determining whether the lamp control unit is in the open mode or a close mode, wherein the open mode enables the lamp control unit to accept a new passcode to lock the commissionable lighting parameter, and wherein the close mode prevents the lamp control unit from changing the commissionable lighting parameter when in a locked state and enables the lamp control unit to change the commissionable lighting parameter when in an unlocked state.

4. The computer-implemented method of claim 3, further comprising:

receiving an input entry via the Bluetooth protocol, wherein the lamp control unit transitions from the locked state of the close mode to the unlocked state of the close mode in response to receiving the input entry that matches an encrypted passcode stored as a second characteristic field in the Bluetooth attribute profile stored in the lamp control unit.

5. The computer-implemented method of claim 1, further comprising:

receiving, from the mobile device, a second input string for a second characteristic field of the Bluetooth attribute profile stored in the lamp control unit;

comparing the second input string to an encrypted passcode string presently stored in the second characteristic field; and authenticating the mobile device to commission the lamp control unit in response to determining that the second input string matches the encrypted passcode string.

6. The computer-implemented method of claim 5, wherein the commissioning is performed in response to verifying that the second input string matches the encrypted passcode string.

7. The computer-implemented method of claim 1, wherein the locking the lamp control unit includes:

receiving, via the Bluetooth protocol, a passcode string in a second characteristic field of the Bluetooth attribute profile stored in the lamp control unit;

determining that the lamp control unit is in the open mode where no previous passcode is saved in the second characteristic field; and saving the passcode as an encrypted string in the Bluetooth attribute profile of the lamp control unit.

8. The computer-implemented method of claim 1, wherein the control interface is a wired interface connected to a dimmer panel or a digital multiplex (DMX) panel.

9. The computer-implemented method of claim 1, wherein the input is representative of a command provided via a digital dimming mechanism, an analog dimming mechanism, or a voltage control mechanism.

10. The computer-implemented method of claim 1, wherein the secret string includes an encrypted string, a hash value based on a seed value known to the lamp commissioning application and the lamp control unit, a preset string, a rotating token that changes based on a schedule, or any combination thereof.

11. The computer-implemented method of claim 1, wherein the lamp control unit is part of the LED-based lamp.

12. The computer-implemented method of claim 1, wherein the lamp control unit is an external control module for the LED-based lamp.

13. The computer-implemented method of claim 1, wherein the commissioning includes identifying one or more lighting configuration parameters associated with a preset lighting configuration, and wherein the adjusting the operational lighting parameter includes selecting the preset lighting configuration to configure one or more color channels of the LED-based lamp.

14. The computer-implemented method of claim 1, wherein the commissioning includes mapping a Digital Multiplex (DMX) channel to control a characteristic of light outputted by the LED-based lamp, wherein the DMX channel is in accordance with a lighting equipment control of a DMX512 standard.

15. The computer-implemented method of claim 1, wherein the commissionable lighting parameters comprise one or more of definition of presets, definition of digital multiplex channels, definition of lamp groups, naming of the lamp control unit, correlated color temperature (CCT) value, definition of lighting animation, default CCT, default hue, default saturation, and default brightness, and wherein the operational lighting parameters comprise one or more of a parameter for turning the lamp control unit on and off, a parameter for dimming level control, a parameter for preset selection, and a parameter for turning animation on and off.

16. A non-transitory computer-readable data memory storing instructions that are executable by a computer system, the executable instructions comprising:

instructions for initiating, via a Bluetooth protocol, a connection between a lamp control unit for a light-emitting diode-based (LED-based) lamp and a mobile device;

instructions for commissioning via the Bluetooth protocol, the lamp control unit with one or more commissionable lighting parameters configured to be adjusted by a user via a lamp commissioning application executing in the mobile device, wherein each commissionable lighting parameter:

specifies which one of lighting characteristics can be controlled by one or more operational lighting parameters, a corresponding operational lighting parameter of the one or more operational lighting parameters being configured to be adjusted by a corresponding control interface of one or more control interfaces other than the mobile device to control a lighting characteristic of the LED-based lamp, and dictates at least one available value of the corresponding operational lighting parameter for adjustment by the corresponding control interface;

instructions for locking the lamp control unit with a password to prevent the lamp control unit from changing the one or more commissionable lighting parameters;

instructions for adjusting, in response to the commissioning by the mobile device, the one or more operational lighting parameters based on input received via the one or more control interfaces;

instructions for controlling the LED-based lamp based on the one or more adjusted operational lighting parameters in compliance with the one or more commissionable lighting parameters;

instructions for receiving a first input string for a first characteristic field of a Bluetooth attribute profile stored in the lamp control unit;

instructions for comparing the first input string to a secret string configured to enable a reset procedure; and instructions for resetting the lamp control unit to an open mode such that any passcode stored in the Bluetooth attribute profile is erased.

17. The non-transitory computer-readable data memory of claim 16, wherein the executable instructions further comprise:

instructions for receiving, from the mobile device, a second input string for a second characteristic field of the Bluetooth attribute profile stored in the lamp control unit;

instructions for comparing the second input string to an encrypted passcode string presently stored in the second characteristic field; and instructions for authenticating the mobile device to commission the lamp control unit in response to determining that the second input string matches the encrypted passcode string.

18. The non-transitory computer-readable data memory of claim 16, wherein the executable instructions further comprise:

instructions for receiving, via the Bluetooth protocol, a passcode string in a second characteristic field of the Bluetooth attribute profile stored in the lamp control unit;

instructions for determining that the lamp control unit is in the open mode where no previous passcode is saved in the second characteristic field; and instructions for saving the passcode as an encrypted string in the Bluetooth attribute profile of the lamp control unit.

19. The non-transitory computer-readable data memory of claim 16, wherein the executable instructions further comprise instructions for determining whether the lamp control unit is in the open mode or a close mode, wherein the instructions for commissioning are in response to determining that the lamp control unit is in the open mode.

20. A computer-implemented method comprising: initiating, via a wireless protocol, a connection between a lamp control unit for a light emitting diode-based (LED-based) lamp and a mobile device;

commissioning, via the wireless protocol, the lamp control unit with a commissionable lighting parameter of a plurality of commissionable lighting parameters configured to be adjusted by a user via a lamp commissioning application executed by the mobile device, wherein the commissionable lighting parameter:

specifies which one of lighting characteristics can be controlled by an operational lighting parameter of a plurality of operational lighting parameters, the operational lighting parameter being configured to be adjusted by a control interface other than the mobile device to control a lighting characteristic of the LED-based lamp, and dictates available values of the lighting characteristic for adjustment by the control interface;

in response to the commissioning by the mobile device, adjusting the operational lighting parameter based on input received via the control interface other than the mobile device;

determining that the adjusted operational lighting parameter complies with the commissionable lighting parameter;

controlling the LED-based lamp based on the adjusted operational lighting parameter;

receiving an input string for a characteristic field of a Bluetooth attribute profile stored in the lamp control unit;

comparing the input string to a secret string configured to enable a reset procedure; and resetting the lamp control unit to an open mode such that any passcode stored in the Bluetooth attribute profile is erased.

21. The computer-implemented method of claim 20, further comprising:

preventing the lamp control unit from changing the commissionable lighting parameter.

22. The computer-implemented method of claim 21, wherein the preventing is performed by locking the lamp control unit with a password.

23. The computer-implemented method of claim 20, wherein the control interface is a wired interface.

24. The computer-implemented method of claim 20, wherein the wireless protocol is a Bluetooth protocol, and wherein the control interface is configured in accordance with a digital multiplex (DMX) light control protocol.

* * * * *

UNITED STATES PATENT AND TRADEMARK OFFICE
CERTIFICATE OF CORRECTION

PATENT NO. : 10,819,824 B2
APPLICATION NO. : 15/151815
DATED : October 27, 2020
INVENTOR(S) : Eric Lebel et al.

It is certified that error appears in the above-identified patent and that said Letters Patent is hereby corrected as shown below:

On the Title Page

On page 2, in Column 2, item (56), Other Publications, Line 9 delete "14/105,850" and insert -- 14/705,850 --

In the Specification

Column 1, Line 8 delete "62/159,180" and insert -- 62/159,880 --

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*